US010735485B2

(12) United States Patent
Mihály et al.

(10) Patent No.: US 10,735,485 B2
(45) Date of Patent: Aug. 4, 2020

(54) TECHNIQUE FOR ADAPTIVE STREAMING OF TEMPORALLY SCALING MEDIA SEGMENT LEVELS

(71) Applicant: TELEFONAKTIEBOLAGET LM ERICSSON (PUBL), Stockholm (SE)

(72) Inventors: Attila Mihály, Dunakesz (HU); Bence Formanek, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 92 days.

(21) Appl. No.: 15/780,392

(22) PCT Filed: Dec. 4, 2015

(86) PCT No.: PCT/EP2015/078700
§ 371 (c)(1),
(2) Date: May 31, 2018

(87) PCT Pub. No.: WO2017/092830
PCT Pub. Date: Jun. 8, 2017

(65) Prior Publication Data
US 2018/0359297 A1 Dec. 13, 2018

(51) Int. Cl.
*H04L 12/00* (2006.01)
*H04L 29/06* (2006.01)
(Continued)

(52) U.S. Cl.
CPC ...... *H04L 65/4084* (2013.01); *H04L 65/4069* (2013.01); *H04L 65/608* (2013.01);
(Continued)

(58) Field of Classification Search
CPC ............... H04L 65/4084; H04L 65/608; H04L 65/4069; H04L 65/80; H04L 69/16;
(Continued)

(56) References Cited

U.S. PATENT DOCUMENTS

| 7,305,011 B2 * | 12/2007 | Shae ................ H04N 7/17318 345/16 |
| 7,911,956 B2 * | 3/2011 | Schmidt ................ H04L 47/10 370/230 |

(Continued)

FOREIGN PATENT DOCUMENTS

| WO | 2012166813 A1 | 12/2012 |
| WO | 2015004276 A2 | 1/2015 |

OTHER PUBLICATIONS

International Search Report and Written Opinion issued in Application No. PCT/EP2015/078700 dated Feb. 26, 2016, 12 pages.
(Continued)

*Primary Examiner* — Frantz Coby
(74) *Attorney, Agent, or Firm* — Rothwell, Figg, Ernst & Manbeck, P.C.

(57) ABSTRACT

An adaptive streaming system is described in which media content is provided by a media server as a sequence of consecutive media segments for being individually requested by a media client. A method implementation performed by a media client of the system comprises the generation of at least one request in relation to a media segment. The media segment is divided into multiple temporally scaling media segment levels and the at least one request includes a reference to at least one temporal level of the media segment. The media client then triggers transmission of the one or more request towards the media server and processes the one or more temporal levels of the media segment received from the media server in response to the one or more requests.

21 Claims, 17 Drawing Sheets

(51) Int. Cl.
  *H04N 21/845* (2011.01)
  *H04N 21/6373* (2011.01)
  *H04N 21/239* (2011.01)
  *H04N 21/2343* (2011.01)
  *H04L 29/08* (2006.01)

(52) U.S. Cl.
  CPC ......... *H04L 65/80* (2013.01); *H04N 21/2393* (2013.01); *H04N 21/23439* (2013.01); *H04N 21/234327* (2013.01); *H04N 21/6373* (2013.01); *H04N 21/8456* (2013.01); *H04L 65/607* (2013.01); *H04L 67/02* (2013.01); *H04L 69/16* (2013.01)

(58) Field of Classification Search
  CPC .................. H04L 65/607; H04L 67/02; H04N 21/234327; H04N 21/2393; H04N 21/6373; H04N 21/8456; H04N 21/23439
  USPC ......................................... 709/219, 217, 220
  See application file for complete search history.

(56) References Cited

U.S. PATENT DOCUMENTS

| | | | | |
|---|---|---|---|---|
| 8,745,388 | B2* | 6/2014 | Kanungo | H04L 63/0435 380/210 |
| 9,236,963 | B2* | 1/2016 | Gadoury | H04H 20/10 |
| 9,584,557 | B2* | 2/2017 | Panje | H04L 65/60 |
| 10,034,051 | B2* | 7/2018 | Card, II | H04N 21/6582 |
| 2003/0061369 | A1* | 3/2003 | Aksu | H04L 29/06027 709/231 |
| 2011/0116772 | A1* | 5/2011 | Kwon | H04N 21/23439 386/343 |
| 2011/0231660 | A1* | 9/2011 | Kanungo | H04L 63/0435 713/168 |
| 2013/0103849 | A1* | 4/2013 | Mao | H04N 21/8456 709/231 |
| 2013/0185756 | A1 | 7/2013 | Fröjdh et al. | |
| 2013/0287091 | A1* | 10/2013 | Shaw | H04L 65/602 375/240.02 |
| 2013/0290493 | A1* | 10/2013 | Oyman | H04W 72/0413 709/219 |
| 2014/0019587 | A1* | 1/2014 | Giladi | H04L 29/06476 709/217 |
| 2014/0025836 | A1* | 1/2014 | Gupta | H04N 21/8456 709/231 |
| 2014/0143439 | A1* | 5/2014 | Ramamurthy | H04N 21/23439 709/231 |
| 2014/0222962 | A1* | 8/2014 | Mao | H04N 21/4305 709/219 |
| 2014/0281010 | A1* | 9/2014 | Panje | H04L 65/60 709/231 |
| 2014/0317668 | A1* | 10/2014 | Zhang | H04N 21/442 725/116 |
| 2014/0344410 | A1* | 11/2014 | Saremi | H04L 65/602 709/219 |
| 2015/0134846 | A1* | 5/2015 | Bazar | H04L 65/608 709/231 |
| 2016/0182600 | A1* | 6/2016 | Swaminathan | H04L 67/02 709/217 |
| 2017/0085620 | A1* | 3/2017 | Swaminathan | G06F 1/3228 |

OTHER PUBLICATIONS

Thomas, E. et al., "Client-requested push for DASH [CE-FDH]", 110. MPEG meeting; Oct. 22, 2014-Oct. 24, 2014; Strasbourg; (Motion Picture Expert Group or ISO/IEC JTC1/SC29/WG11), No. m34641, XP030063013, 6 pages.

Long, B., "Proposed study text for 23009-3 for low latency", 113. MPEG meeting; Oct. 19, 2015-Oct. 23, 2015; Geneva; (Motion Picture Expert Group or ISO/IEC JTC1/SC29/WG11), No. m37491, XP030065859, 64 pages.

Amon, P. et al., "File Format for Scalable Video Coding", IEEE Transactions on Circuits ad Systems for Video Technology, IEEE Service Center, Piscataway, NJ, US, vol. 17, No. 9, (Sep. 1, 2007), XP011193013, 12 pages.

Mueller, CH. et al., "Dynamic Adaptive Streaming over HTTP/2.0", 2013 IEEE International Conference on Multimedia and EXPO (ICME), Jul. 15, 2013, XP032488176, pp. 1-6.

ISO "ISO/IEC/23009-1:2012 Information technology—Dynamic adaptive streaming over HTTP (DASH)—Part 1: Media presentation description and segment formats", retrieved Dec. 19, 2018, 2 pages.

Pantos, R. et al., "HTTP Live Streaming draft-pantos-http-live-streaming-16", Apple Inc.; Apr. 15, 2015, 48 pages.

Ruellan, H., "DASH and HTTP2 draft-ruellan-httpbis-dash-http2-00", Network Working Group, Mar. 23, 2015, 5 pages.

Huang, Te-Yuan et al., "A Buffer-Based Approach to Rate Adaptation: Evidence from a Large Video Streaming Service", Aug. 17-22, 2014, 14 pages.

* cited by examiner

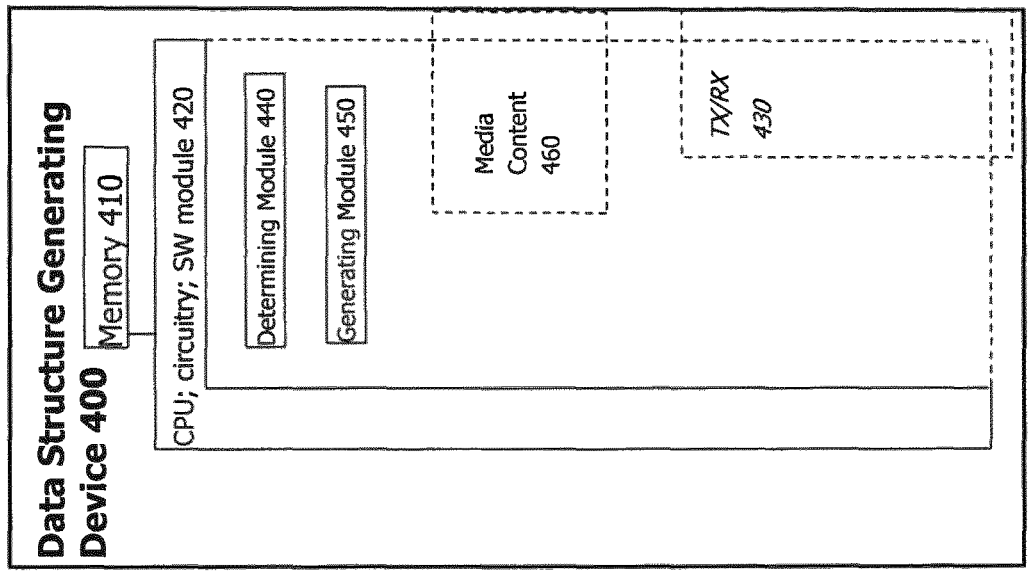
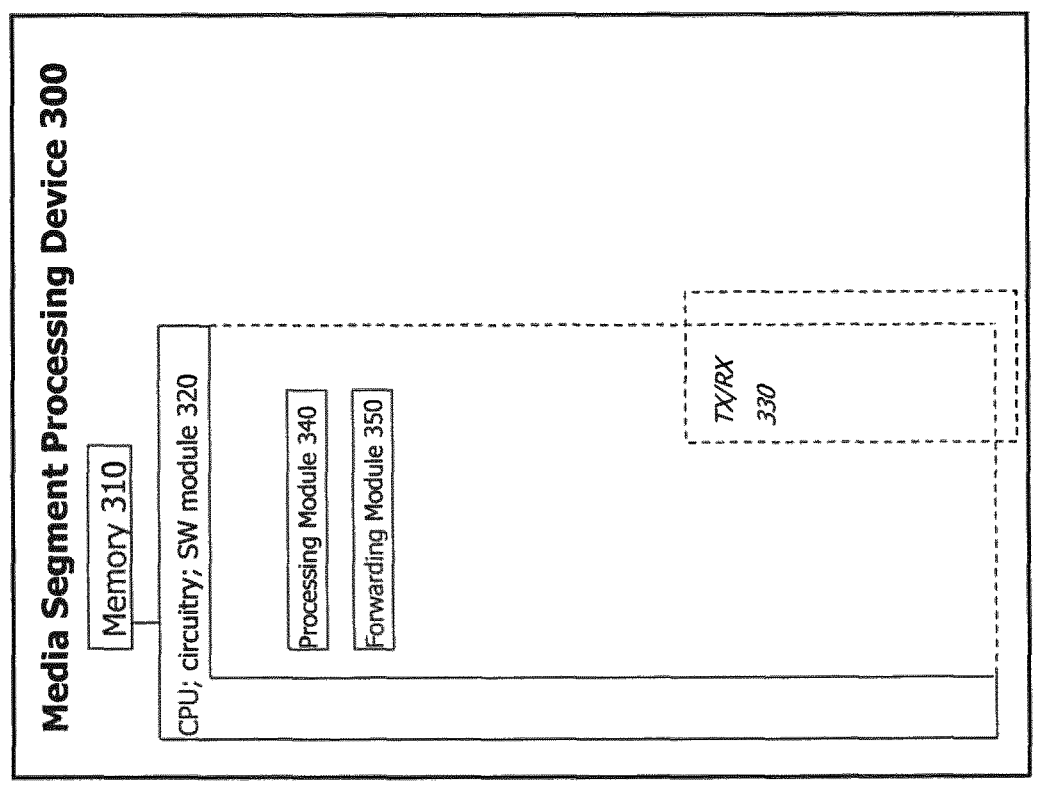
Fig. 3B
Fig. 3A

Fig. 11

HTTP1.1.

GET /segment_path HTTP/1.1
Range: bytes=r_L^1, ...r_L^M
Host: example.org
(other fields)

GET /segment_path HTTP/1.1
Range: bytes=r_H^1, ...r_H^N
Host: example.org
(other fields)

HTTP2.0

HEADERS
+ PRIORITY (stream dependency = 0x0)
+ END_STREAM
:method = GET
:scheme = https
:path = /segment_path
range = bytes=r_L^1, ...r_L^M
host = example.org + PRIORITY (stream dependency = ID of previous stream)
+ END_STREAM
+ END_HEADERS
:method = GET
:scheme = https
:path = /segment_path
range = bytes=r_H^1, ...r_H^N
host = example.org

```
<SegmentList timescale="90000" duration="5400000">
  <RepresentationIndex sourceURL="repres-index.sidx"/>
  <SegmentURL media="segment-1.ts"/>
    <SegmentLevel L0bytes=r_L0^1, ..., r_L0^M/>
    <SegmentLevel L1bytes=r_L1^1, ..., r_L1^N/>
  <SegmentURL media="segment-2.ts"/>
</SegmentList>
```

Fig. 12

TECHNIQUE FOR ADAPTIVE STREAMING OF TEMPORALLY SCALING MEDIA SEGMENT LEVELS

CROSS REFERENCE TO RELATED APPLICATION(S)

This application is a 35 U.S.C. § 371 National Stage of International Patent Application No. PCT/EP2015/078700, filed Dec. 4, 2015, designating the United States, which is incorporated by this reference.

TECHNICAL FIELD

The present disclosure generally relates to a streaming technique in which media content is provided by a media server as a sequence of consecutive media segments for being individually requested by media clients. The technique may be realized in the form of devices, methods, systems, and computer programs.

BACKGROUND

Video-related traffic is the most significant portion of the total internet traffic and continues to grow rapidly. Among the different video delivery methods, HyperText Transfer Protocol—(HTTP-) based adaptive video streaming is becoming more and more popular due to its relative advantages. Compared with conventional streaming, HTTP streaming reuses high quality open source web server software rather than deploying new expensive proprietary streaming servers. Another benefit is that HTTP traffic is able to penetrate firewalls, and the content is also easy to distribute on the existing HTTP-based Content Delivery Networks (CDNs). Examples of HTTP based adaptive streaming are Apple HTTP Live Streaming (HLS), Microsoft Smooth Streaming, Adobe Dynamic Streaming over HTTP or the recent MPEG Dynamic Adaptive Streaming over HTTP (DASH) standard.

It is well known that sudden changes in communication network capacity (e.g., in mobile broadband networks due to handovers, mobility, fading, or other competing traffic) may cause re-buffering events for HTTP-based adaptive streaming. Current actions of media client adaptation to avoid re-buffering are to request a lower (e.g., the base) representation segment upon detecting a low rendering buffer and/or throughput of last segment download. Alternatively, the media client may decide to stop the current segment download, and request a lower (e.g., the base) representation. However, these actions may be too late to avoid media rendering freeze. Moreover, in case of aborting the download of a media segment, the downloaded fraction of the media segment is wasted.

SUMMARY

Accordingly, there is a need for an adaptive streaming technique that avoids one or more of these drawbacks, or other drawbacks.

According to a first aspect, a media client is presented for an adaptive streaming system in which media content is provided by a media server as a sequence of consecutive media segments for being individually requested by media clients, each media segment comprising multiple media data items. The media client comprises a memory and at least one processor coupled to the memory, wherein the memory stores program code that configures the at least one processor to generate at least one request in relation to a media segment divided into multiple temporally scaling media segment levels, wherein the at least one request includes a reference to at least one temporal level of the media segment. The program code further configures the at least one processor to trigger transmission of the at least one request towards the media server, and to process at least one temporal level of the media segment received, in response to the at least one request, from the media server.

The media segment may comprise two, three or more temporal levels (sometimes also referred to as "temporal layers"). As such, one, two, three or more temporal levels may be requested by the media client (in one more or multiple successive requests). In particular, the media client may request at least two temporal levels, namely a lower temporal level and a higher temporal level.

The one or more temporal levels may be requested using a regular media segment request format (or otherwise). Additionally, or alternatively, the one or more temporal levels may be received in a regular media segment format (or otherwise). In such a case, an individual media segment received by the media client may only contain the media data items defining an individual temporal level. The two or more temporal levels of two or more of such "regular format" media segments may then be re-combined to the original media segment by the media client (e.g., prior to a decoding thereof).

The different temporal levels may in certain variants be exploited to perform bitrate adaptations. Such bitrate adaptations can be necessary in view of varying network conditions.

The temporal levels may be hierarchically structured. In one variant, the hierarchical structure is such that media data items within one temporal level of the media segment only depend on one or more of:

at least one media data item on the same temporal level; and at least one media data item on at least one lower temporal level.

As understood herein, a lower (higher) temporal level may generally also be the lowest (highest) temporal level of a particular media segment. Moreover, a media data item may take the form of a media frame or any other media unit typically used to transport media content.

The program code may configure the processor of the media client to generate multiple requests in relation to the media segment. In such a case, each of the multiple requests may include a reference to a different one of the multiple temporal levels of the media segment. In certain implementations, the number of requests generated in relation to a particular media segment may equal the number of temporally scaling media segment levels of that media segment.

The program code may further configure the processor of the media client to trigger transmission of the multiple requests. As an example, transmission of the multiple requests may be triggered such that a request including a reference to a lower temporal level of the media segment is transmitted before a request including a reference to a higher temporal level of the media segment. The multiple requests may be prioritized such that a request including a reference to a lower temporal level of the media segment has a higher priority than a request including a reference to a higher temporal level of the media segment.

The technique presented herein may generally be practised using the HyperText Transfer Protocol (HTTP), such as HTTP 1.0 or HTTP 2.0 (also referred to as HTTP/2). Therefore, the at least one request generated by the media client may be a HTTP request. Accordingly, the streaming system may be a HTTP-based adaptive streaming system.

In certain implementation, the technique presented herein may exploit novel features of HTTP/2. For example, the multiple requests may be HTTP requests multiplexed in accordance with HTTP/2. In certain variants it may be possible to multiplex the multiple HTTP requests to one Internet Protocol (IP) packet. Moreover, the multiple HTTP requests may be prioritized in accordance with HTTP/2.

In other variants, one request from the media client may trigger the media server to push multiple temporal levels to the media client. As an example, one request may be generated to include a reference to multiple (e.g., all) temporal levels of the media segment. Moreover, that request may (implicitly or explicitly) request the media server to push one or more of the referenced temporal levels to the media client (e.g., in accordance with HTTP/2). In such a case, the number of requests from the media client required to completely fetch the temporal levels of a particular media segments may be lower than the number of requested temporal levels. As an example, a single request may be generated to include references to all temporal levels of a particular media segment.

The program code may further configure the processor to detect a media content handling irregularity, such as an under-run of a replay buffer at the media client, a network congestion state in a downstream direction from the media server, and so on. Assuming that a (e.g., previously transmitted) request included a reference to at least one higher temporal level of the media segment above a lowest temporal level, the program code may further configure the processor to trigger, in response to the detected irregularity, an action that aborts or prevents reception of the at least one higher temporal level of the media segment from the media server.

Such an action may comprise a breaking of a Transmission Control Protocol (TCP) connection to the media server. Alternatively, or in addition, such an action may comprise transmission of a message to cause the media server to prevent or abort transmission of the at least one higher temporal level of the media segment towards the media client. Such a message may, for example, comprise an RST_STREAM frame in accordance with HTTP/2.

Additionally, or in the alternative, the program code may configure the processor to trigger, in response to the detected irregularity, transmission of a further request towards the media server. That further request may include a reference to at least one lowest temporal level of a subsequent media segment. In this manner, the lowest temporal level of the subsequent media segment may in some instances the obtained faster by the media client as the preceding media segment is not downloaded in all temporal levels. Media freezes or other media replay-related problems can thus be avoided.

In some variants the program code may further configured the processor to determine the reference in the request to the temporal level. That reference may be determined from various items of information, including one or more of a manifest file pertaining to the media content, a dedicated indexing segment referenced in a manifest file, a first media segment of the media content, an initialization segment pertaining to the media content, and indexing information pertaining to the media segment or the media content.

A particular reference in the request to a particular temporal level of the media segment may identify one or more locations within the media segment of one or more media content items which belong to that temporal level. As an example, the one or more locations may be identified via one or more byte ranges in regard of the media segment or the media content as a whole. In certain variants, the multiple temporally scaling media segment levels may be defined as different byte ranges of the media data items within the media segment, so that the one or more locations can be identified via one or more of the media data item byte ranges. As such, byte range requests may be generated by the media client.

In certain implementations the multiple temporally scaling media segment levels may be defined as dependent media content representations. As understood herein, the dependent representations may include one independent representation and at least one representation that is dependent on the independent representation or another dependent representation. A particular reference in the request to a particular temporal level of the media segment may in such a case identify a particular media content representation. Such media content representations may, for example, conventionally be intended to define alternative versions of the media content (e.g., of different media content rendering qualities).

The program code may further configure the processor to process multiple temporal levels of the media segment received from the media server by re-combining them into the media segment. If, for example, the individual temporal levels are received in the form of media content items belonging to multiple byte ranges of the media segment, the media content items of different temporal levels may be placed at their proper byte ranges in the media segment to be re-combined.

The media content may be encoded in accordance with any encoding standard, such as Advanced Video Coding (AVC), including H.264/MPEG-4 AVC and its extension Scalable Video Coding (SVC), or High Efficiency Video Coding (HEVC), including its scalable extensions Scalable HEVC (SHVC).

In one variant, the at least one request includes a reference to two temporal levels of the media segment, wherein the two temporal levels belong to a dedicated SVC or SHVC layer of the media content. As an example, the two temporal levels may belong to an SVC or SHVC base layer. The media client may be configured to operate in accordance with one or more of DASH and HLS. One or more of the requests may be HTTP requests.

According to a further aspect, a media segment processing device is provided for an adaptive streaming system in which media content is provided by a media server as a sequence of consecutive media segments for being individually requested by media clients, each media segment comprising multiple media data items and multiple temporally scaling media segment levels. The media segment processing device comprises a memory and at least one processor coupled to the memory, wherein the memory stores program code that configures the at least one processor to process multiple temporal levels of a media segment, wherein the multiple temporal levels are received from the media server in response to one or more requests, wherein the processing comprises re-combining the multiple temporal levels into the media segment. The program code further configures the at least one processor to forward the re-combined media segment to a media decoder.

In one variant, the multiple temporal levels may be configured to be requested as different byte ranges of the media segment. In such a case the program code may configure the processor to re-combine the different byte ranges by placing them at their proper location in the media segment.

Additionally, or in the alternative, the multiple temporal levels may be configured to be requested as different media content representations. In such a case the program code may configure the processor to re-combine the different representations into the media segment that is to be rendered. Such a re-combination may take into account dependencies between the different representations. Such dependencies may be signalled to the media client in various ways, for example in a manifest file pertaining to the media content, in a dedicated indexing segment referenced in a manifest file, in a first media segment of the media content, in an initialization segment pertaining to the media content, or an indexing information pertaining to the media segment or the media content.

The media segment processing device may be comprised by the media client presented herein. The media client may further comprise a media decoder coupled to the media segment processing device.

According to a still further aspect, a media server is provided for an adaptive streaming system in which media content is provided by the media server as a sequence of consecutive media segments for being individually requested by media clients, each media segment comprising multiple media data items. The media server comprises a memory and at least one processor coupled to the memory, wherein the memory stores program code that configures the at least one processor to process at least one request received in relation to a media segment from a media client. The media segment comprises multiple temporally scaling media segment levels and the at least one request includes a reference to at least one temporal level of the media segment. The program code further configures the at least one processor to trigger transmission of the at least one temporal level of the media segment to the client.

A particular media segment may be provided by the media server in different representations, wherein each representation corresponds to a certain media content rendering quality. For each representation of a particular media segment, multiple temporally scaling temporal levels may be provided for being requested by media clients.

The program code may further configure the processor of the media server to trigger transmission of multiple temporal levels of the media segment to the media client. The multiple temporal levels may be transmitted such that a lower temporal level of the media segment is transmitted before a higher temporal level of the media segment.

In general, the media server may be configured to properly react to any of the requests presented herein. As an example, the media server may be compliant with HTTP/2 and the associated multiplexing, prioritization and push mechanisms.

Also provided is a data structure generating device for an adaptive streaming system in which media content is provided as a sequence of consecutive media segments for being individually requested by media clients, each media segment comprising multiple media data items and multiple temporally scaling media segment levels. The data structure generating device comprises a memory and at least one processor coupled to the memory, wherein the memory stores program code that configures the at least one processor to determine locations in a media data segment of its multiple temporal levels. The program code further configures the at least one processor of the data structure generating device to generate a data structure associating the temporal levels with the locations of the temporal levels in the media data segment.

The data structure may permit to determine a reference to a particular temporal level for a particular request. As indicated above, such a data structure may constitute or be comprised in a manifest file, an indexing segment referenced in a manifest file, a media segment of the media content, an initialization segment pertaining to the media content, and indexing information pertaining to the media segment or the media content. The locations may be identified via one or more byte ranges or otherwise.

The data structure generating device may be comprised by the media server presented herein. Alternatively, the data structure generating device may be a component separate from the media server.

A further aspect is directed to a media content processing device for an adaptive streaming system in which media content is provided as a sequence of consecutive media segments for being individually requested by media clients, each media segment comprising multiple media data items and multiple temporally scaling media segment levels. The media content processing device comprises a memory and at least one processor coupled to the memory, wherein the memory stores program code that configures the at least one processor to identify multiple temporal levels within a media segment, and to generate dependent media content representations of the media segment, each media content representation comprising only media data items of the media segment that belong to one of the identified temporal levels.

Also presented is an adaptive streaming system comprising one or more of the media clients presented herein and the media server presented herein. The adaptive streaming system may additionally comprise the media content processing device presented herein.

According to a further aspect, a method is presented of operating a media client in an adaptive streaming system in which media content is provided by a media server as a sequence of consecutive media segments for being individually requested by media clients, each media segment comprising multiple media data items. The method comprises generating at least one request in relation to a media segment, wherein the media segment is divided into multiple temporally scaling media segment levels and wherein the at least one request includes a reference to at least one temporal level of the media segment. The method further comprises triggering transmission of the at least one request towards the media server, and processing at least one temporal level of the media segment received, in response to the at least one request, from the media server.

According to a further method aspect, a method is presented of operating a media segment processing device in an adaptive streaming system in which media content is provided by a media server is a sequence of consecutive media segments for being individually requested by media clients, each media segment comprising multiple media data items and multiple temporally scaling media segment levels. The method comprises processing multiple temporal levels of a media segment, wherein the temporal levels are received from the media server in response to one or more requests, and wherein the processing comprises re-combining the multiple temporal levels into the media segment. The method further comprises forwarding the re-combined media segment to a media decoder.

According to another method aspect, a method is presented of operating a media server in an adaptive streaming system in which media content is provided by the media server as a sequence of consecutive media segments for being individually requested by media clients, each media segment comprising multiple media data items. The method comprises processing at least one request received in relation to a media segment from a media client, wherein the media segment comprises multiple temporally scaling media segment levels and wherein the at least one request includes a reference to at least one temporal level of the media segment. The method further comprises triggering transmission of the at least one temporal level of the media segment to the media client.

Also provided is a method of operating a data structure generating device in an adaptive streaming system in which media content is provided as a sequence of consecutive media segments for being individually requested by media clients, each media segment comprising multiple media data items and multiple temporally scaling media segment levels. The method comprises determining locations in a media segment of its multiple temporal levels, and generating a data structure associating the temporal levels with the locations of the temporal levels in the media segment. Still further, a method is provided of operating a media content processing device in an adaptive streaming system in which media content is provided as a sequence of consecutive media segments for being individually requested by media clients and wherein each media segment comprises multiple media data items and multiple temporally scaling media segment levels. The method comprises identifying multiple temporal levels within a media segment, and generating dependent media content representations of the media segment, each media content representation comprising only media data items of the media segment that belong to one of the identified temporal levels.

Still further, a computer program product is provided comprising program code portions for performing the steps of any of the methods and method aspects presented herein when the computer program product is executed by one or more processors. The computer program product may be stored on a computer-readable recording medium, such as a CD-ROM, DVD or semiconductor memory. Also, the computer program product may be provided for download via a communication network.

BRIEF DESCRIPTION OF THE DRAWINGS

Embodiments of the technique presented herein are described herein below with reference to the accompanying drawings, in which:

FIGS. 3A to 3C illustrate embodiments of a media segment processing device, a data structure generating device and a media content processing device;

FIG. 11 illustrates the content of exemplary HTTP requests;

FIG. 12 illustrates an embodiment of data structure embodiment in the form of a manifest file;

DETAILED DESCRIPTION

In the following description, for purposes of explanation and not limitation, specific details are set forth (such as particular signalling steps and network protocols) in order to provide a thorough understanding of the technique presented herein. It will be apparent to one skilled in the art that the present disclosure may be practiced in other embodiments that depart from these specific details. For example, the embodiments will partially be described in the context of exemplary communication protocols such as HTTP, exemplary encoding standards such as AVC and SVC and exemplary streaming standards such as DASH and HLS; however, this does not rule out the use of the present disclosure in connection with other communication, encoding and streaming technologies.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that when the following embodiments are described in the context of methods and method steps, the technique presented herein may also be embodied in a computer program product as well as in a system comprising a computer processor and a memory coupled to the processor, wherein the memory is encoded with one or more programs that cause the processor to execute the services, functions and steps disclosed herein.

Figure 1:
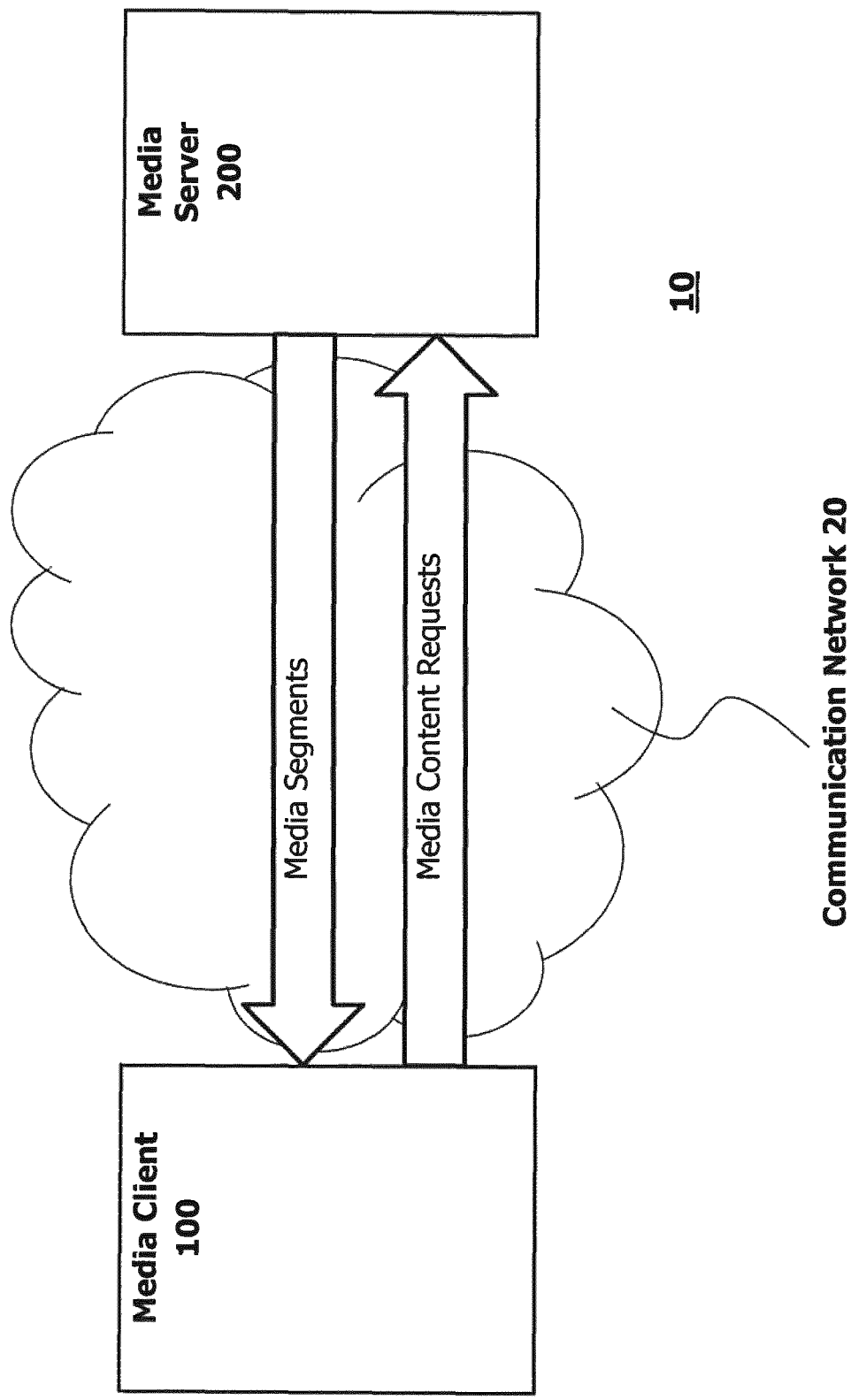
FIG. 1 illustrates an embodiment of an adaptive streaming system.

FIG. 1 shows an embodiment of an adaptive streaming system 10 in which aspects of the present disclosure can be implemented. The streaming system 10 comprises at least one media client 100 and typically a large number of media clients 100. The media client 100 may take the form of any wireless or wirebound user terminal, such as a smartphone, a tablet computer, a notebook computer, a vehicle-based terminal or a PC. The system 10 further comprises a media server 200. The media client 100 and the media server 200 are connected via a communication network 20. The communication network 20 may comprise wireless and wire bound network portions.

As shown in FIG. 1, the media server 200 is configured to provide one or more media content streams with variable bitrate encoding via the communication network 20 to the media client 100. The media content streams are provided as a sequence of consecutive media segments that can individually be requested by the media client 100 (and optionally in different representations). Each media segment comprises multiple media data items, such as media frames. As will be described in greater detail below, the media segments are provided by the media server 200 in response to individual media content requests from the media client 100.

In one variant, the media content stream is end-to-end encrypted from the media server 200 to the media client 100. The media data stream will then transparently be routed through the communications network 20. In other variants, the communication network 20 may apply content-based Quality of Service (QoS) techniques to prioritize the transport of data packets of higher relevance to the media client 100.

Figure 2:
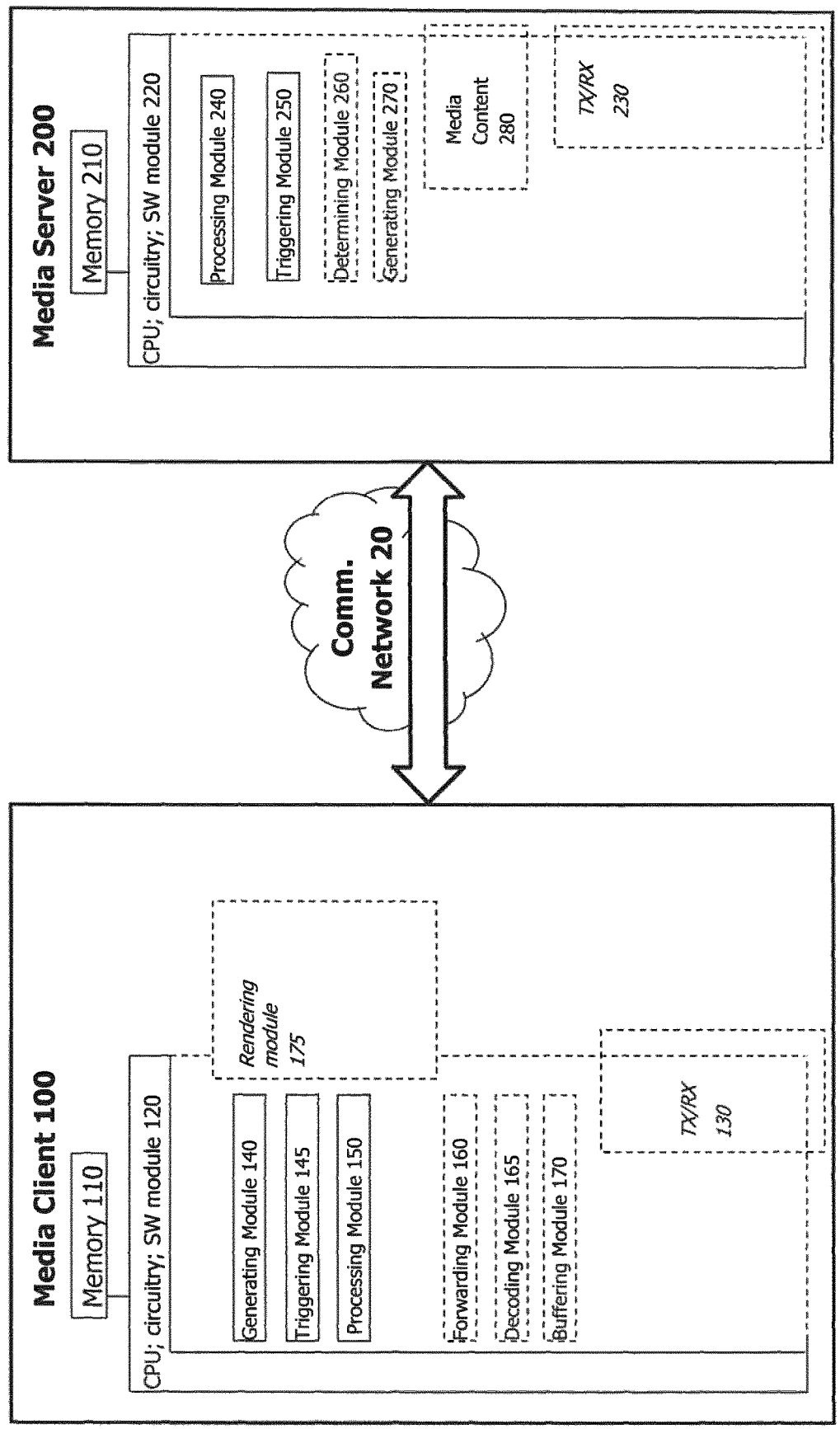
FIG. 2 illustrates embodiments of a media client and a media server.

FIG. 2 shows embodiments of the media client 100 and the media server 200 of FIG. 1. In FIG. 2, optional components are indicated by dashed lines. It will be appreciated that the media client 100 and the media server 200 presented herein are not limited to the implementations illustrated in FIG. 2.

As shown in FIG. 2, the media client 100 comprises a memory 110, a core functionality 120 (e.g., one or more of a Central Processing Unit, CPU, dedicated circuitry and/or a software module) coupled to or provided in the memory 110, and a transmitter/receiver unit 130. The media client 100 further comprises a generating module 140, a triggering module 145, a processing module 150, a forwarding module 160, a decoding module 165, a buffering module 170, and a rendering module 175.

The media client 200 comprises a memory 210, a core functionality 220 (e.g., one or more of a CPU, dedicated circuitry and/or a software module) coupled to or provided in the memory 210, and a transmitter/receiver unit 230. The media client 200 further comprises a processing module 240, a triggering module 250, a determining module 260, and a generating module 270. Additionally, the media server 200 has access to media content 280. The media content 280 may, for example, be provided in a database accessible by the media server 200.

Figure 3C:
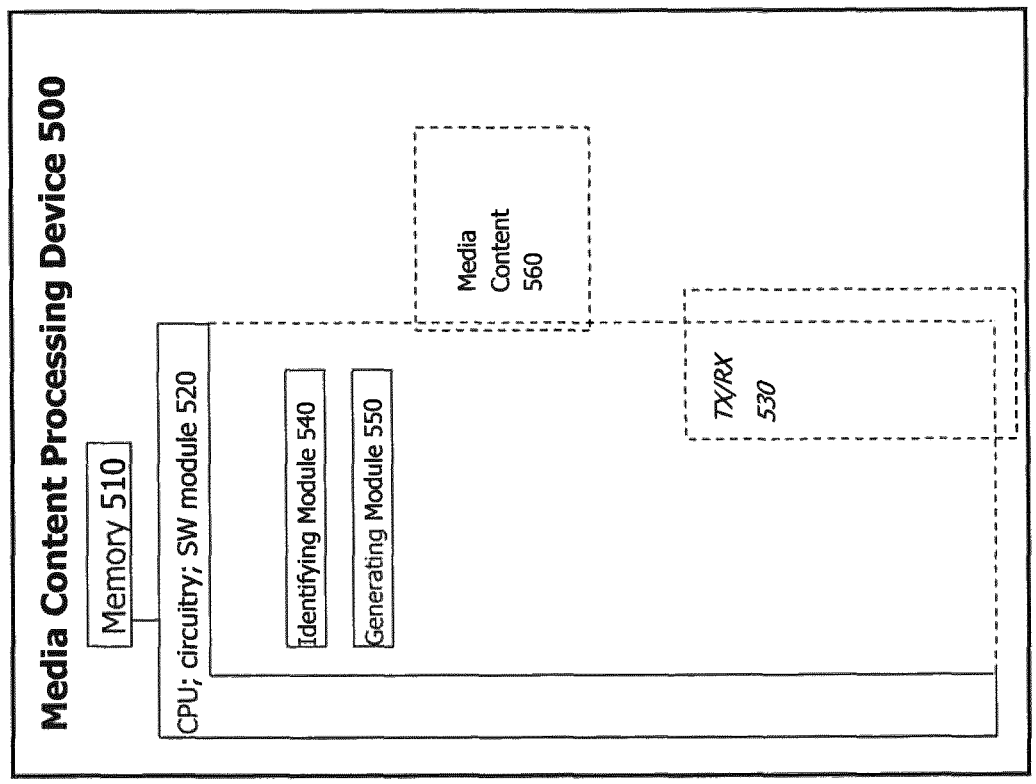

FIGS. 3A, 3B and 3C show embodiments of a media segment processing device 300, a data structure generating device 400 and a media content processing device 500, respectively. The media segment processing device 300 may be integrated into the media client 100 or may be a stand-alone device. In a similar manner, the data structure generating device 400 may be integrated into the media server 200 or may be a stand-alone device. For example, the data structure generating device 400 may belong to the infrastructure of a content creator, whereas the media server 200 may belong to the infrastructure of a content provider. In a similar manner, also the content processing device 500 may be a stand-alone device (in particular within the infrastructure of a content provider) or, alternatively, may be integrated into the media server 200.

As show in FIG. 3A, the media segment processing device 300 comprises a memory 310, a core functionality 320 (e.g., one or more of a Central Processing Unit, CPU, dedicated circuitry and/or a software module) coupled to or provided in the memory 320, and a transmitter/receiver unit 330. The media segment processing device 300 further comprises a processing module 340 and a forwarding module 350. If integrated into the media client 100, the processing module 340 may at least in part correspond to the processing module 150 of the media client 100, and the forwarding module 350 may correspond at least in part to the forwarding module 160.

The data structure generating device 400 of FIG. 3B comprises a memory 410, a core functionality 420 (e.g., one or more of a Central Processing Unit, CPU, dedicated circuitry and/or a software module) coupled to or provided in the memory 410, and a transmitter/receiver unit 430. The data structure generating device 400 further comprises a determining module 440 and a generating module 450. When integrated into the media server 200, the determining module 440 may correspond at least in part to the determining module 260 of the media server 200, and the generating module 450 may correspond at least in part to the generating module 270.

Additionally, the data structure generating device 400 has (e.g., read and write) access to media content 460. The media content 460 may, for example, be stored in a database accessible by the data structure generating device 400. In one implementation, the media server 200 and the data structure generating device 400 have access to the same media content database.

The media content processing device 500 of FIG. 3C comprises a memory 510, a core functionality 520 (e.g., one or more of a Central Processing Unit, CPU, dedicated circuitry and/or a software module) coupled to or provided in the memory 510, and a transmitter/receiver unit 530. The media content processing device 500 further comprises an identifying module 540 and a generating module 550.

Additionally, the media content processing device 500 has (e.g., read and write) access to media content 560. The media content 560 may, for example, be stored in a database accessible by the media content processing device 500. In one implementation, the media server 200 and the media content processing device 500 have access to the same media content database.

The individual modules illustrated in FIGS. 2 and 3A to 3C may at least partially be a functionality running on the respective CPU, or may alternatively be separate functional entities or means (e.g., controlled by the respective CPU). The individual CPUs may be configured, for example using program code residing in the respective memory, to realize the functionality of an individual module. The CPUs may further be configured to control the respective transmitter/receiver unit. The memories may serve for storing program code for carrying out the methods and method steps according to the aspects disclosed herein when executed by the respective CPU.

The transmitter/receiver units may be realized to comprise suitable (hardware and/or software) interfaces. They may further comprise suitable signal generation and evaluation functions.

Figure 4:
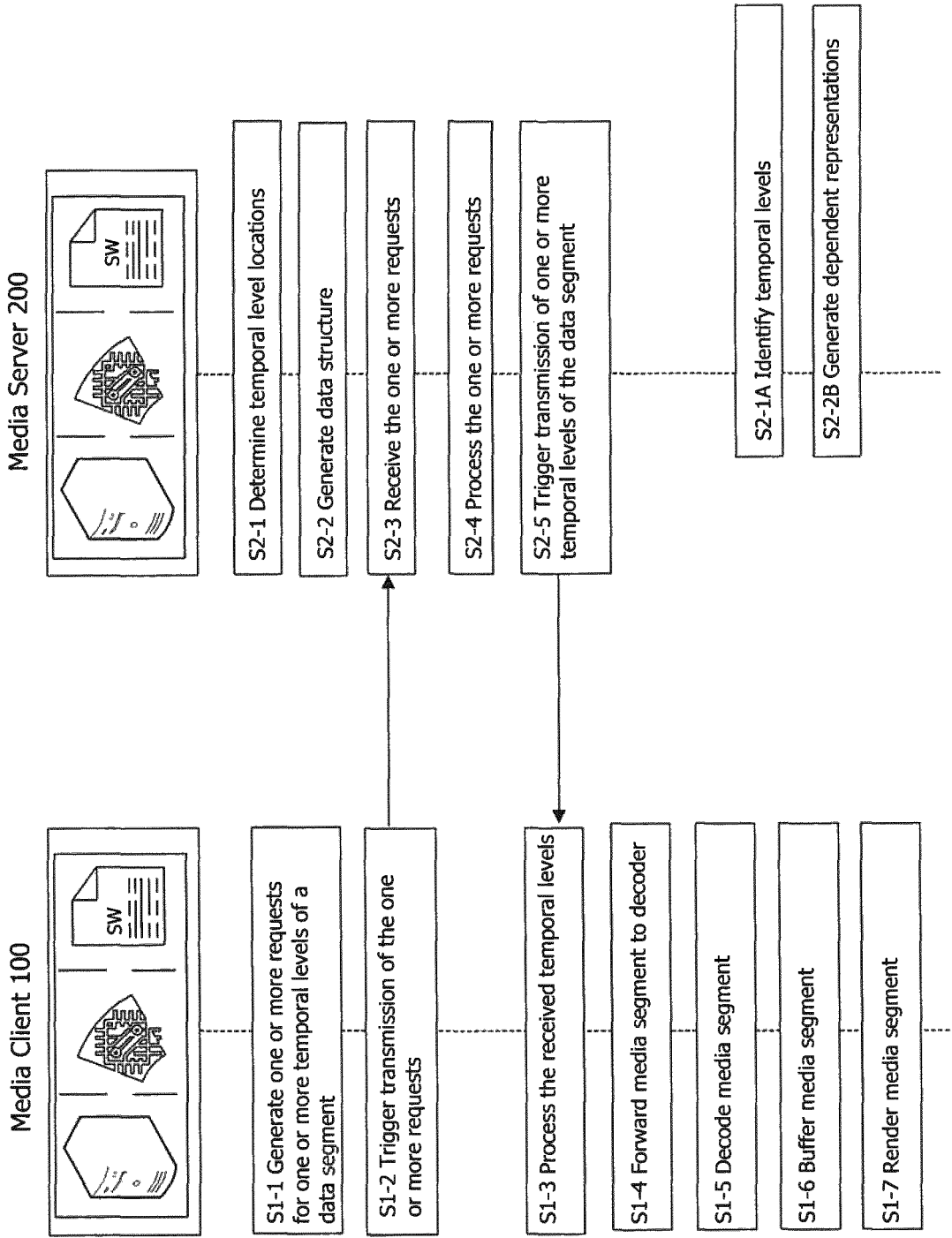
FIG. 4 illustrates flow charts of method embodiments.

FIG. 4 shows method embodiments which also reflect the interaction between the system entities 100, 200, 300, 400 and 500 shown in FIGS. 1, 2 and 3A to 3C. In the signalling diagram of FIG. 4, time aspects between signalling steps are reflected in the vertical arrangement of the signalling step sequence as well as in the sequence numbers. It is to be noted that the time aspects indicated in FIG. 4 do not necessarily restrict any one of the method steps shown to the particular step sequence outlined in FIG. 4.

In the context of FIG. 4 it will be assumed that the media segment processing device 300 is integrated into the media client 100, and that the data structure generating device 400 is integrated into the media server 200. As explained above, this does not rule out that any of the media segment processing device 300 and the data structure generating device 400 is realized as a stand-alone device (e.g., coupled to the media client 100 and the media server 200, respectively) or otherwise.

The technique presented herein, and in particular the embodiments described with reference to FIG. 4 and further below, can be performed in connection with any adaptive media content streaming protocol that is based on HTTP or similar requests to enable the fetching of individual media content portions by the media client 100. The media content to be streamed may thus be provided as a sequence of consecutive media segments for being individually requested by the media client 100 for download from the media server 200.

The media content comprises individual media data items, such as media frames. The media data items constituting an individual media segment are logically (and, optionally, physically) divided into multiple temporally scaling media segment levels. All media data items within one temporal level of a media segment can only depend on media data items of the media segment within the same temporal level or on media data items of the media segment within lower temporal levels.

Figure 5:
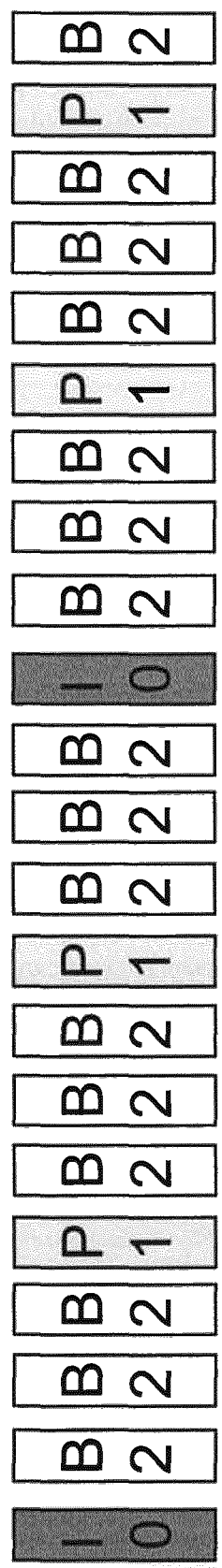
FIG. 5 illustrates temporal levels of an exemplary video segment.

FIG. 5 illustrates exemplary media segment comprising media data items in the form of video frames encoded to introduce dependencies among the individual frames. In more detail, the video frames comprise I, P and B frames that can be used define associated temporal levels 0, 1 and 2. One may, for instance, extract I frames (or, more precisely, key frames or Random Access Points, RAPs) and logically and/or physically group same into the lowest temporal level 0. Further options are to exploit hierarchical P and/or B frames to define higher temporal levels of the media segment. In FIG. 5, I, P and B frames are indexed with their respective temporal level 0, 1 and 2 respectively. As will be appreciated, video frames within one temporal level only depend on video frames within the same temporal level or on video frames within lower temporal levels in the example of FIG. 5.

In the embodiment illustrated in FIG. 5, the different frame types are provided in an interleaved manner. In alternative embodiments, it would be possible to group the media data items belonging to one particular temporal level in individual sub-segments (e.g., within a continuous byte range). Such a grouping may be performed by the content provider (e.g., using the media content processing device 500 and suitable implementations of the identifying module 540 and the generating module 550).

Prior to the actual media content streaming from the media server 200 to the media client 100, a data structure will be generated by the data structure generating device 400 for a particular media content (e.g., an individual movie or song). The data structure will be used by the media client 100 to request individual temporal levels of the media content from the media server 200 (see FIG. 5).

To this end, in step S2-1 of FIG. 4, the determining module 260 of the media server 200 (corresponding to the determining module 440 of the data structure generating device 400) parses the individual media segments of the media content to determine the locations in an individual media segment of its multiple temporal levels. In more detail, the locations of the media data items within the media segment that belong to a particular temporal level are identified. In the example of FIG. 5, the locations of the individual media frames pertaining to temporal level 0, temporal level 1 and temporal level 2 (i.e., of the I, P and B frames, respectively) within the particular media segment will be determined. As an example, the locations may be determined in the form of one or more byte ranges or otherwise. To facilitate the determination in step S2-1, the content creator may prepare the individual media segments by grouping media data items belonging to dedicated temporal level into groups, each group occupying a continues byte range within the media segment. Such a grouping is, however, optional.

Then, in step S2-2, the generating module 270 of the media server 200 (corresponding to the generating module 450 of the data structure generating device 400) generates a data structure that associates the temporal levels with the locations of the temporal levels in the particular media segment. The association can take the form of a mapping which indicates for each temporal level the locations of that temporal level (i.e., of the media data items constituting that temporal level) in the particular media segment.

The resulting data structure will then be sent to the media client 100 to enable a proper referencing of the temporal levels (not shown in FIG. 4). The data structure generated in step S2-2 may, for example, take the form of (or be included in) one or more of a manifest file pertaining to the media content, a dedicated indexing segment referenced in a manifest file, a first media segment of the media content, an initialization segment pertaining to the media content, or indexing information pertaining to the media segment or the media content.

Once the media client 100 is in possession of the data structure or similar information, it may generate one or more requests in relation to a particular media segment using the generating module 140, as shown in step S1-1 in FIG. 4. A particular request generated in step S1-1 includes a reference to one or more temporal levels of the media segment. Using, for example, the data structure generated in step S2-2, the media client 100 may, for referencing a particular temporal level, determine the associated location or locations in the media segment of the media data items constituting that temporal level. The corresponding location(s), for example in the form of one or more byte ranges, may then be included into the request generated in step S1-1.

In a further step S1-2, the triggering module 145 of the media client 100 triggers transmission of the one or more requests generated in step S1-1 towards the media server 200. The transmission may be performed via the transmission/reception unit 130 of the media client 100.

The media server 200 receives in step S2-3 the one or more request via its transmission/reception unit 230. The processing module 240 of the media server 200 then processes the one or more request in step S2-4. In more detail, processing of the one or more requests by the media server 200 comprises fetching the data items constituting the requested one or more temporal levels of the media segment (e.g., from a media content database, see reference numeral 280 in FIG. 2).

Then, in step S2-5, the triggering module 250 of the media server 200 triggers transmission of the one or more requested temporal levels of the data segment via the transmission/reception unit 230 towards the media client 100. In case multiple temporal levels need to be sent, they may be sent in a single response message or in dedicated response messages.

The one or more temporal levels in the one or more response messages will be received by the media client 100 via the transmission/reception unit 130. Then, the processing module 150 of the media client will process to the one or more received temporal levels. The processing performed by the media client can relate to any processing operation typically performed in connection with adaptive streaming.

In one particular example, the processing module 150 may (among others) realize the processing functions of the media segment processing device 300 (i.e., of its processing module 340). In such a case, the processing may comprise re-combining the multiple temporal levels of the media segment received from the media client 200 into the media segment. This re-combining may comprise placing the individual media data items constituting the multiple temporal levels at their correct position within the media segment (e.g., in accordance with the byte range information indicated in the data structure generated in step S2-2).

In a further step S1-4 performed by the forwarding module 165 of the media client 100 (corresponding to the forwarding module 350 of the media segment processing device 300), the re-combined media segment is forwarded to a decoder as realized in the present embodiment by the decoding module 165. Then, in step S1-5, the decoding module 165 of the media client 100 decodes the re-combined media segment in a conventional manner (e.g., in accordance with AVC, HEVC, SVC or SHVC).

The decoded media segment (i.e., the decoded media data items of the media segment) are then buffered by buffering module 170 in step S1-6 until they can be rendered, in step S1-7, by rendering module 175. The rendering module 175 may, for example, take the form of a display device and/or a loudspeaker.

Depending on the particular implementation, the media content may be processed by the media content processing device 500 (see FIG. 3C) prior to the operations discussed with reference to FIG. 4 thus far. In the exemplary embodiment illustrated in FIG. 4, it will be assumed that the media content processing device 500 is integrated into the media server 200 and configured to perform dedicated steps S2-1A and S2-26 that, in certain variants, may replace or complement step S2-1 and S2-2.

In more detail, in step S2-1A, the identifying module 540 of the media content processing device 500 identifies multiple temporal levels within a plurality of media segments (or other any other partitionings) constituting the media content. Based on the identification in step S2-1A, the generating module 550 generates in step S2-2B dependent media content representations of an individual media segment (e.g., at least one potentially independent representation and one further representation depending therefrom). Each representation is generated such that it comprises only media data items of the media segment that belong to one of the identified temporal levels. In the example of FIG. 5, a first representation may thus contain only the I frames, a second representation may contain only the P frames, and a third representation may contain only the B frames.

The individual representations may then be stored as media content 560 in a database accessible by the media server 200 (see FIG. 3C). Additionally, information regarding the dependencies of the different representations including the different temporal levels of a dedicated media segment may be determined and signalled to the media client 100 (for example within or in connection with a manifest file).

In case the multiple temporally scaling media segment levels are defined as dependent media content representations, a particular reference in a request generated in step S1-1 by the media client 100 may identify a particular media content representation to be retrieved from the media server 200. Upon processing multiple received temporal levels (i.e., different representations) in step S1-3, the media client 100 may re-combine the different representations into the original media segment taking into account the dependencies between the different representations. The remaining processing operations of the media client 100 can then be performed as explained above.

In the implementation illustrated in FIG. 4, a media segment can be requested and downloaded successively on a temporal level-by-temporal level-basis, rather than requesting and downloading the "complete" media segment at once. The one or more requests may be configured such that the temporal levels are requested in a hierarchical manner by the media client 100. That is, the media data items of higher importance (belonging to lower temporal levels) can be requested first. This gives the advantage that, in the case of an irregularity as to media content handling (e.g., in case of a network congestion), a lower temporal level of a media segment can be rendered alone (if at least a substantial part of it has been received before the irregularity was detected). On the other hand, the download of one or more upper temporal levels of the same segment may be aborted or prevented. Instead, one or more lower temporal levels of the next (i.e., subsequent) media segment may be requested and downloaded. In this manner, the media client 100 can continue an ongoing media rendering operation to avoid a re-buffering situation or any other situation that significantly distorts the user experience. The resulting responsiveness of the technique presented herein permits, in certain variants, a decision logic within the media client 100 to apply a more aggressive selection of the quality (e.g., in terms of a particular media segment representation) of the next media segment to be downloaded so as to achieve higher download bitrates (e.g., by an earlier bitrate up-switch decision).

Compared to existing situations the additional signalling and processing overhead (e.g., in terms of generating the data structure in step S2-2) is comparatively small. Additionally, resources consumed in connection with aborted media segment downloads (e.g., in a communication network 20) are decreased because not the whole media segment but only one or more temporal levels thereof are wasted. Depending on the implementation, the technique presented herein does not require any upgrades of the media server 200, and legacy media clients not implementing the technique presented herein will not be impacted. The technique presented herein is applicable over a wide range of streaming, encoding and transmission protocols.

In all the embodiments presented herein, audio segments may be loaded separately and, in certain variants, before the lowest temporal level video segments. This approach ensures listening continuity even if the video segments would not get through.

Figure 6:
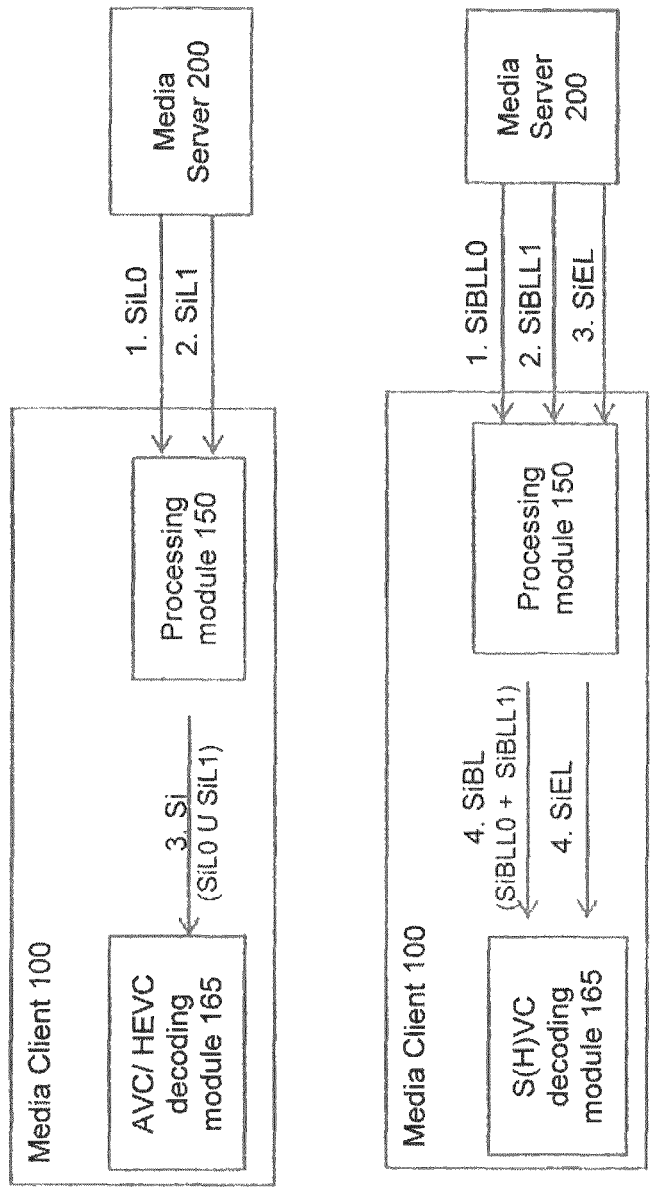
FIGS. 6A/6B illustrate exemplary modes of operation of media client embodiments.

FIGS. 6A and 6B illustrate two exemplary media segment download scenarios in connection with media content encoded in accordance with AVC/HEVC (FIG. 6A) and media content encoded in accordance with SVC/SHVC (FIG. 6B). In FIGS. 6A and 6B, an individual media segment is denoted Si. An individual temporal level of a media segment is noted Li, with i=0 being the lowest temporal level.

In the AVC/HEVC scenario of FIG. 6A it will be assumed that media segment Si comprises two temporally scaling media segment levels L0 and L1. The media client 100 has requested both temporal levels L0 and L1 from the media server 200 via one or more requests. The requests may be HTTP requests compliant with DASH or HLS.

The media server 200 in a first step provides temporal media segment level SiL0, and in a second step temporal media segment level SiL1, as shown in FIG. 6A. The processing module 150 of the media client will then re-combine the media segment Si from its two temporal levels SiL0 and SiL1 and forward the re-combined media segment Si to the AVC/HEVC decoding module 165.

In a congestion case or upon determining any other media content handling irregularity, the download of the higher temporal level SiL1 may be aborted, so that only the lower temporal level SiL0 will be received the processing module 150. The processing module 150 will in such a case only forward that lower temporal level SiL0 of media segment Si to the decoding module 165. In accordance with AVC/HEVC, that single temporal level SiL0 can still be successfully decoded (e.g., in the form of I frames, see FIG. 5).

FIG. 6B illustrates an alternative processing and decoding scenario for the scalable extensions of AVC and HEVC, namely SVC and SHVC, respectively. SVC and SHVC include features to provide different representations of the same media content within the same bitstream by selecting a valid sub-stream. SVC and SHVC divide the media content into layers, which correspond to different quality, spatial or temporal representations, including a base layer (which corresponds to the lowest representation) and one or more enhancement layers (which are higher representations that increase the quality, spatial and/or temporal representation when added to the base layer).

SVC and SHVC provide a similar flexibility as the present disclosure since it allows dividing media content both per SVC/SHVC layer and per time intervals. It thus becomes possible to prioritize different elements of the media content according to their importance. In a normal SVC/SHVC implementation, there is no need for signalling or processing temporal level information, and for a corresponding re-combination of temporal levels prior to decoding. There still exists the possibility to combine the advantages of SVC/SHVC encoded media content with the present disclosure. For example, the SVC/SHVC base layer may be split up in hierarchical temporal levels as explained above. This is shown for the exemplary case of two temporal levels in FIG. 6B.

As shown in FIG. 6B, the base layer BL of media segment Si is divided into two temporal levels, SiBLL0 and SiBLL1, respectively. The one or more enhancement layers may, but need not split-up into temporal levels. As also shown in FIG. 6B, the media server 200 provides to the media client 100 in three subsequent transmissions the lower temporal level of the base layer SiBLL0 first, then the higher temporal level of the base layer SiBLL1, and finally the (single) enhancement layer SiEL.

The processing module 150 combines the two temporal levels of the base layer into the "complete" base layer segment SiBL and forwards the re-combined base segment SiBL together with the enhancement layer segment SiEL in a further step to the SVC/SHVC decoding module 165. In case the network conditions or other circumstances jeopardize even the download of the (full) base layer, the scenario illustrated in FIG. 6B avoids a media freeze or related problems when at least the lower temporal level of the base layer can be successfully received.

In the following additional embodiments will be described with reference to the exemplary DASH standard as defined in ISO/IEC 23009-1:2012(E). It will be appreciated that the present disclosure could alternatively be implemented using any alternative adaptive streaming protocol that permits the media client 100 to request individual media segments, such as HLS.

The following embodiments are at least partially based on the embodiments described above with reference to FIGS. 1 to 6B. It will, of course, be appreciated that this does not limit the following embodiments to any of the details of the preceding embodiments.

In adaptive streaming, media content characteristics are typically described in a so-called manifest file. In the DASH standard, the manifest file is also called Media Presentation Description (MPD). The MPD expresses detailed characteristics of a particular media content using a hierarchical data model. The hierarchical data model includes, for example, information such as segment timing, segment duration, the Universal Source Locator (URL) of the media content to be downloaded, media content bitrates, media content resolutions, and so on.

Figure 7:
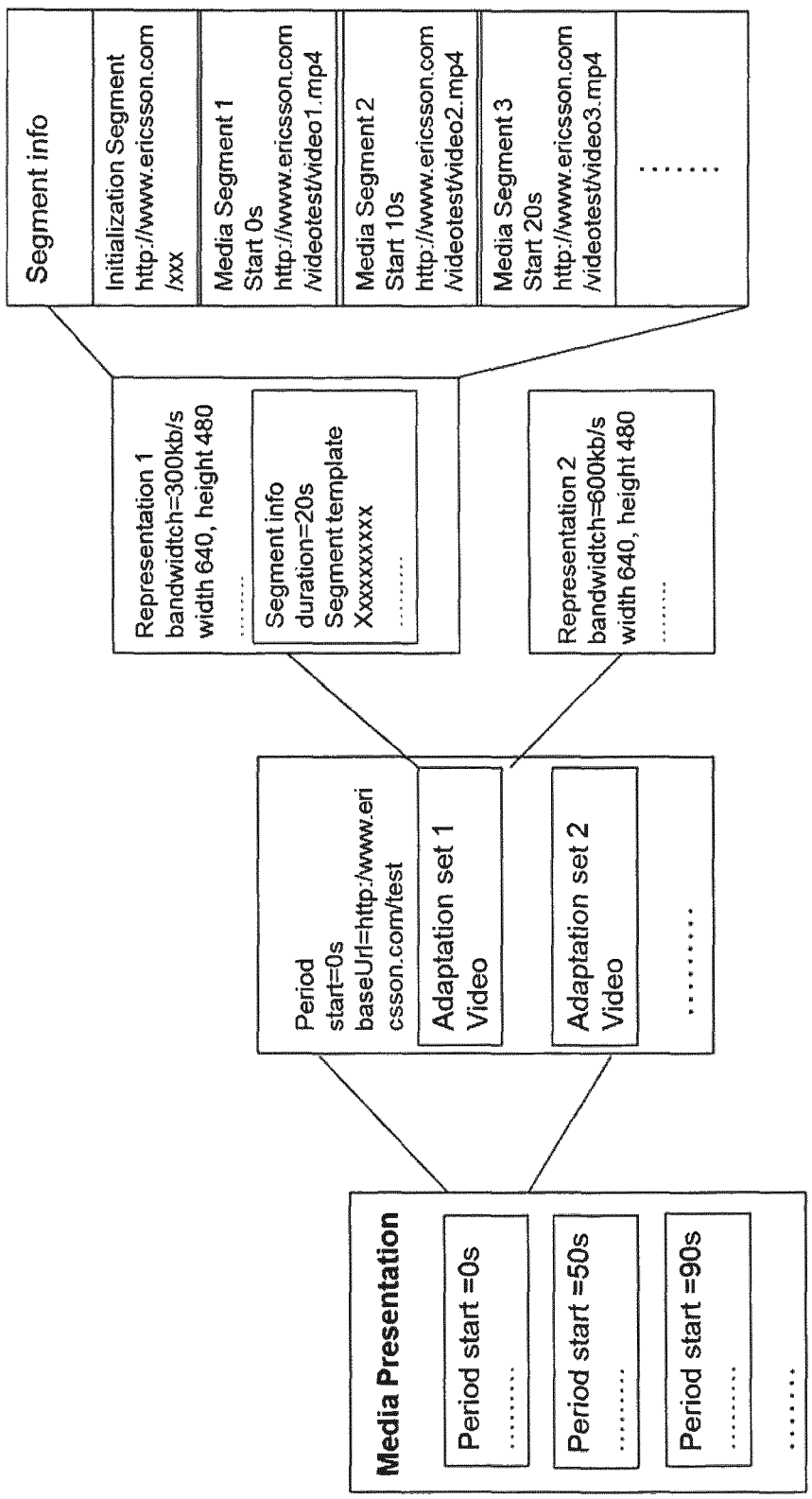
FIG. 7 illustrates a media presentation embodiment.

FIG. 7 illustrates an exemplary MPD for media content in the form of a video clip. As shown therein, a media presentation data structure comprises a sequence of one or more media content presentation periods, wherein each period contains one or more adaptation sets, each adaptation set contains one or more representations, and each representation provides information for one or more media segments. Media segments contain media data items and/or metadata to access, decode and present the media data items included therein. Each segment may, in turn, consist of one or more sub-segments.

An adaptation set contains alternative representations of typically different Quality of Experience (QoE) levels. This means that only one representation within an adaptation set is expected to be presented by the media client 100 at a time. All representations contained in one adaptation set represent the same media content components (and therefore contain media content streams that are considered to be perceptually equivalent). The adaptation set and the representations contained therein shall be prepared and contain sufficient information such that seamless switching across different representations in one adaptation set is enabled.

So-called dependent representations are regular representations except that they depend on a set of complementary representations for decoding and/or presentation. This is to support layered encoding protocols such as SVC, SHVC or Multi Video Coding (MVC). Enhancement layers (or enhancement views) are considered dependent representations that depend on representations that contain lower layers (the complementary representations). The dependency on other representations is indicated in the MPD by the dependency_id.

In case the multiple temporal levels included in a media segment are requested by and sent to the media client 100 in the form of dependent representations as explained above with reference to FIG. 3C and steps S2-1A and S2-2B in FIG. 4, the corresponding dependency_ids of related representations constituting different temporal levels of the same media segment may be communicated as referencing information to the media client 100 to enable a proper temporal level referencing.

The first segment of each representation can be an initialization segment containing the necessary information for an initialization of the decoding module 165 in order to decode the subsequent media segments. The initialization segment typically contains the common information that does not change between media segments (the initialization segment does not carry the actual media data items).

At the beginning of a media content rendering session, the media client 100 has to fetch the manifest file (i.e., the MPD) from the media server 200. From the manifest file, the media client 100 obtains the necessary information of proper media content streaming.

Figure 8:
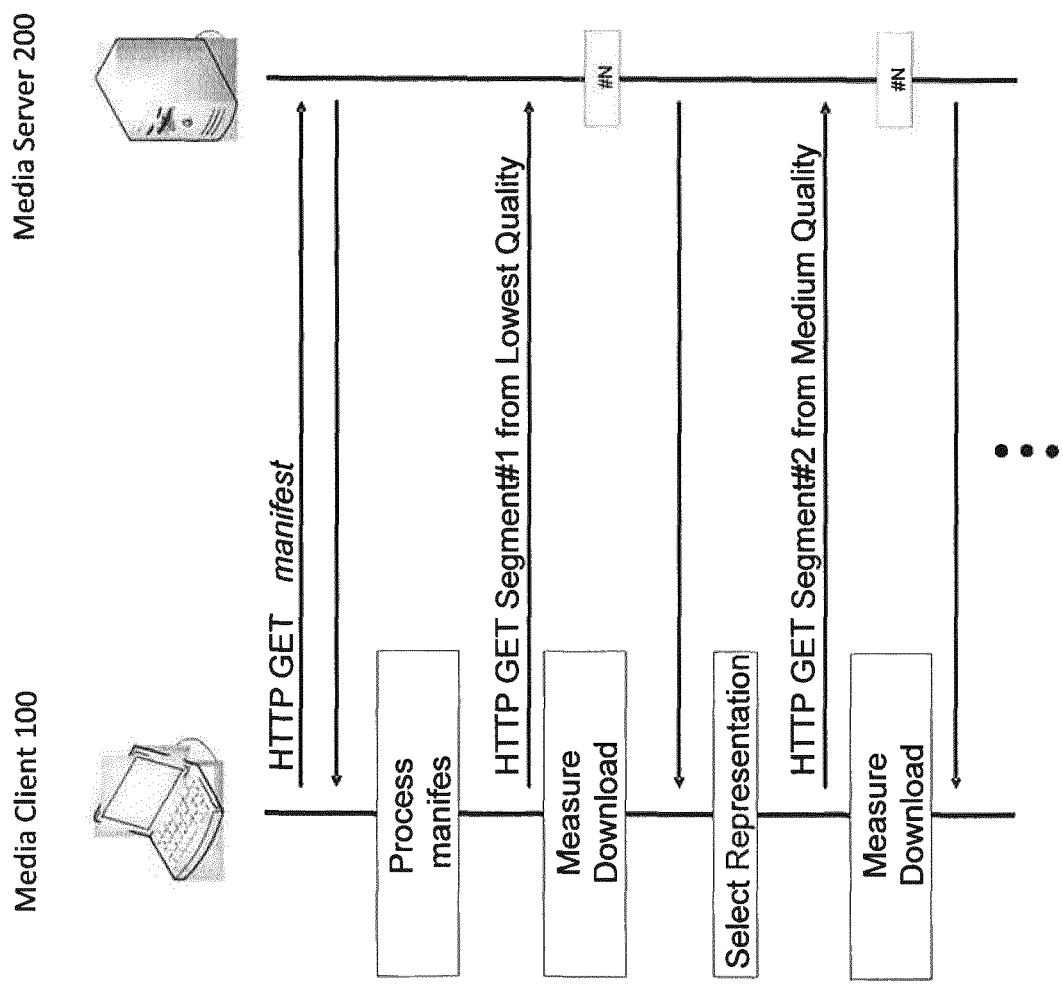
FIG. 8 illustrates an exemplary signalling diagram.

As illustrated in the signalling diagram of FIG. 8, the media client 100 initially transmits a HTTP GET request to obtain the manifest file from the media server 200. Once the manifest file is obtained from the media server 200 in a corresponding response message, the media client 100 then normally selects an initial representation and starts fetching an initialization segment and/or one or more media segments belonging to that representation using appropriate HTTP GET requests.

At a later point in time the media client 100 performs measurements considering, for example, download rates and/or a media buffer length. Based on these measurements, the media client 100 may adjust the selected representation of the media content and fetch further media segments based on the adjusted representation. This process may be repeated multiple times during an individual streaming session.

The present disclosure permits to extend the signalling illustrated in FIG. 8 in such a manner that not only complete media segments may be requested and downloaded from the media server 200, but also individual temporal levels of a particular media segment comprising multiple temporally scaling media segment levels. In order to be able to request an individual temporal level of a media segment, the media client 100 needs to determine the information that enables a proper referencing of an individual temporal level. In the following, various embodiments in this regard will be presented, depending on how the required referencing information is provided to the media client 100 and how the media client 100 requests the temporal levels of the media segments hierarchically.

In a first implementation, the media referencing information (i.e., the temporal level information) is embedded in the indexing information. In this embodiment, the media client 100 can extract media data items (e.g., video frames) belonging to different temporal levels separately based on additional referencing information. The referencing information may, for example, include a mapping of the locations of the media content items (e.g., in the form of byte ranges) to different temporal levels.

The referencing information may be provided in an initialization part of DASH segments (in the case of the ISO base media format) or in a separate index segment (in case of MPEG-2 TS). Index segments may either be associated with a single media segment or may be associated with all media segments in one representation. An index segment may also contain a sub-segment index. One example in this regard is illustrated in FIG. 9, which shows the structure of a representation segment index.

Figure 9:
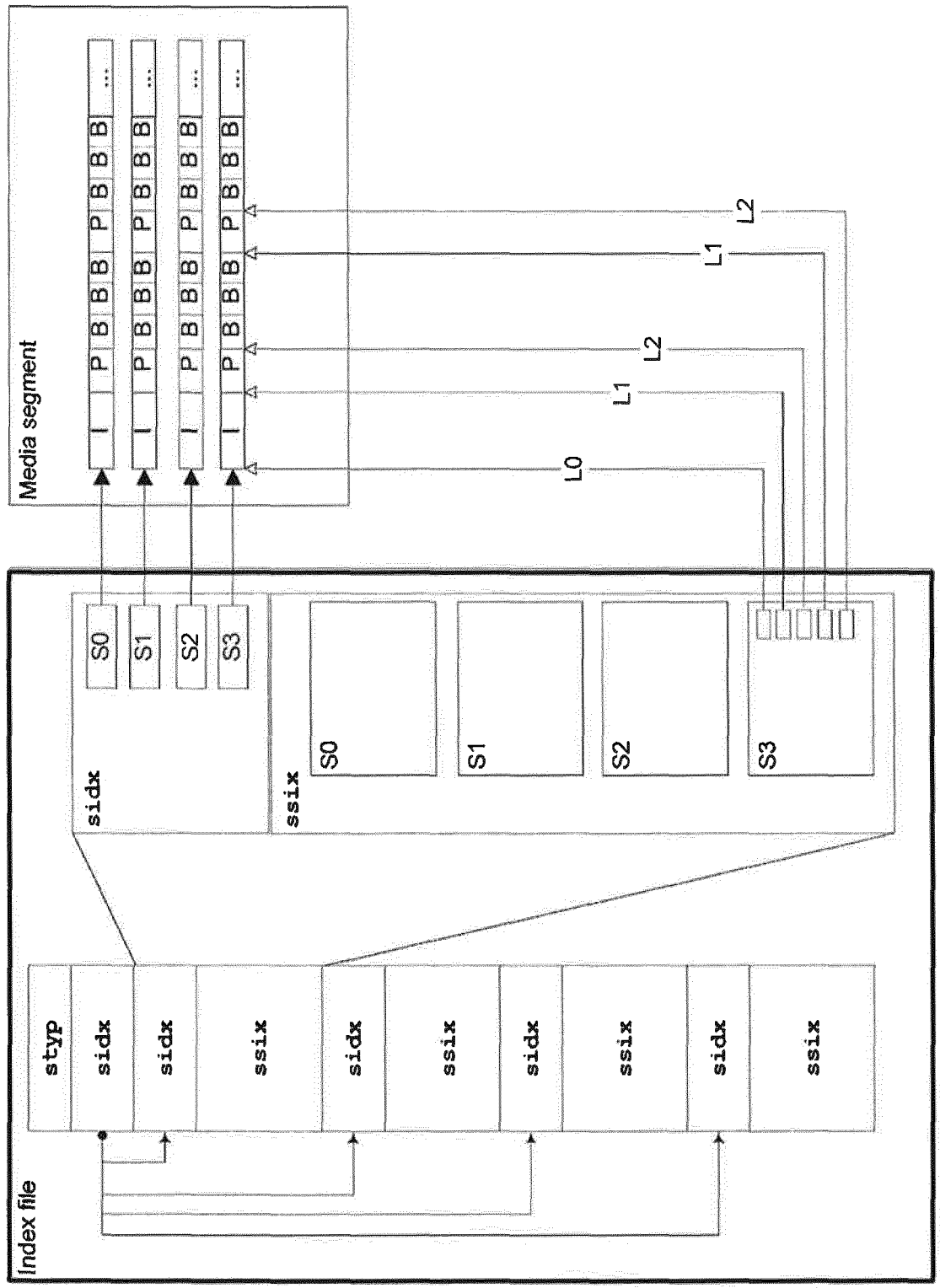
FIG. 9 illustrates an embodiment for transmitting referencing information.

In FIG. 9, the sub-segment index is used to transport referencing information to signal the location of data items pertaining to a particular temporal level in a media segment. In more detail, FIG. 9 shows four consecutive sub-segments (S0, S1, S2 and S3), each index by an "sidx" box containing the byte range information for the individual media data items (e.g., video frames), and mapping these byte ranges to three temporal levels within an exemplary video stream, namely I frames (L0), P frames (L1) and B frames (L2) indexed by an "sidx" box. As such, the resulting mappings constitute one embodiment of a data structure generated by the data structure generating device 400 discussed above.

It should be noted that the presence of indexing information is optional. In certain variants, referencing information may be available to a limited extend to facilitate trick mode execution in the media client 100 (e.g., for fast forward, rewind or seek). Such information could be extended as described herein.

Figure 10:
FIG. 10 illustrates an embodiment of a signalling diagram.

FIG. 10 shows in a flow chart the signalling between the media client 100 and the media server 200 in connection with requesting and obtaining media segments on a temporal level-by temporal level-basis in an exemplary DASH scenario (e.g., based on referencing information as shown in FIG. 9).

With reference to FIG. 10, the media streaming session starts as a regular DASH session in steps 1 and 2 (see also FIG. 8). That is, the media client 100 fetches and processes the manifest file (MPD) and selects the initial period→adaptation set→representation as illustrated in FIG. 7.

In step 3 the media client 100 uses a HTTP GET request to obtain the indexing information (i.e., a separate initialization index segment or the initialization part of the actual segment of the selected representation). In this regard, the media client 100 may obtain referencing information similar to that shown in FIG. 9.

In a step 4 the media client 100 processes the indexing information to retrieve the referencing information about the temporal levels in the media segment(s). The media content download continues in step 5 by requesting media segments of the media content using HTTP GET requests. From the referencing information determined in step 4, the media client 100 can infer which media content items (e.g., video frames) belong to which temporal level and which byte range in the media segment they correspond to. The media client 100 can thus request the media segments hierarchically (i.e., starting with the lowest temporal level and proceeding to higher temporal levels) as explained, for example, with reference to FIGS. 4 to 6B. In step 5, the media client 100 may use so-called byte range HTTP requests as will be explained in more detail below.

As further illustrated in FIG. 10, in step 6, the next representation to used may be selected (e.g., based on the measurement of download parameters) and a following segment of the selected representation may be downloaded in step 7 in accordance with the selection representation. The download in step 7 may either occur in a conventional manner or hierarchically based on temporal media segment levels as explained in connection with the step 5.

As discussed above, the media client issues byte range HTTP requests to separately download each of the temporal levels of a media segment. The byte ranges of the lowest temporal level(s) can be requested by the media client 100 (or provided by the media server 200) with the highest priority, followed by the byte ranges of the next higher temporal level, and so on. This approach ensures that media data items belonging to lower temporal levels are downloaded before media data items belonging to higher temporal levels. Since byte range requests are an optional HTTP feature, one pre-requisite of this approach is that the media server 200 supports the range request mechanism and informs the media client 100 about this, for example, in the response header (indicated by the "Accept-Ranges" header field).

When the media data transfer protocol is HTTP 1.0, the media client 100 may download the media segments using byte range HTTP requests as specified in RFC 7233. An example request is illustrated on the left-hand side of FIG. 11 and will now be described in more detail.

Initially, one or more byte ranges of media data items belonging to the lowest temporal level (r_L^1, . . . r_L^M in FIG. 11) are requested in a first HTTP request, then one or more byte ranges of media data items of the next higher temporal level (r_H^1, . . . r_H^M in FIG. 11), and so on, until the whole media segment is downloaded. The HTTP pipe-lining feature may be utilized to increase the download efficiency.

In an exemplary HTTP 2.0 (or HTTP/2) realization, example HTTP requests are illustrated on the right-hand side of FIG. 11. HTTP/2 provides a multiplexing feature that can efficiently be exploited in connection with the present disclosure. With HTTP/2, the HEADERS frame may be used to multiplex different media content requests into one HTTP request. It is also possible to indicate to the media server 200 the order in which the different requests should be granted. This may be done, for example, by setting the "Priority" flag in the frame header (see FIG. 1 in RFC7540 for the frame header format including the "Priority" flag). Moreover, the "Dependency" field in the HEADERS frame payload (see FIG. 7 in RFC7540) may be configured to the stream identifier of the stream defined by the request of the next lowest temporal level information (or to "0x0" for the stream requesting the lowest temporal level media data items).

Since the media server 200 does not have to wait until the HTTP request for the next temporal level arrives, there will not be any efficiency problems. Moreover, HPACK header compression (RFC7541) permits that the header of the subsequent request contains only the difference compared to the information in the prior request. For the present case, this would represent only a view bytes representing the difference in the "Priority" or "Dependency" field and in the byte ranges of the different temporal levels. Thus, it is quite likely that the multiple requests needed to download a complete media segment can be embedded into a single IP packet. The overhead associated with the technique presented herein will thus be minimal compared to the legacy approach of fetching the whole media data segment at once. Yet another benefit of HTTP/2 comes with the possibility of aborting media segment downloads to handle congestion situations, as briefly explained above and as will be explained in more detail below.

A second embodiment of providing referencing information is based on an improved indexing. In such an embodiment the content creator may h improve the efficiency of the technique presented herein by providing (more) detailed information about the temporal levels of a particular media content. For example, video trick modes may be supported by only the identification of byte range information for the I frames, but not for the P frames and the B frames. This approach may be complemented by the content creator by additionally providing byte range information for at least one of the P and B frames so as to define (at least) two temporal levels.

A further approach by the content creator to implement the present disclosure (and to off-load client processing) may be the preparation of a separate index segment also for the ISO base media format and the referencing of it in the MPD file. The separate index segment may contain the necessary referencing information. In this way it is not necessary for the media client 100 to download the first part of each segment first to fetch the indexing information. Alternatively, for the same ISO base media format, all the referencing information may be placed in the first media segment (i.e., also the referencing information for one or more, or all, of the following media segments).

According to a third embodiment, the referencing information can be embedded into the MPD files. This embodiment is based on a co-operation between the content creator and the content distributor (i.e., the operator of the media server 200).

The MPD file may be extended by adding priority tags providing the referencing information. The original MPD structure is kept in order to provide compatibility with legacy media clients. Legacy clients simply ignore the unknown tags.

An example of an extended MPD is illustrated in FIG. 12, wherein the added tags are printed in bold italic. As becomes apparent from FIG. 12, media segment 1 is provided with two additional tags indicative of a respective temporal level L0 and L1, respectively, together with the byte ranges associated with the respective temporal level. As such, the added tags constitute another embodiment of a data structure that can be generated by the data structure generating device 400 discussed above.

Figure 13:
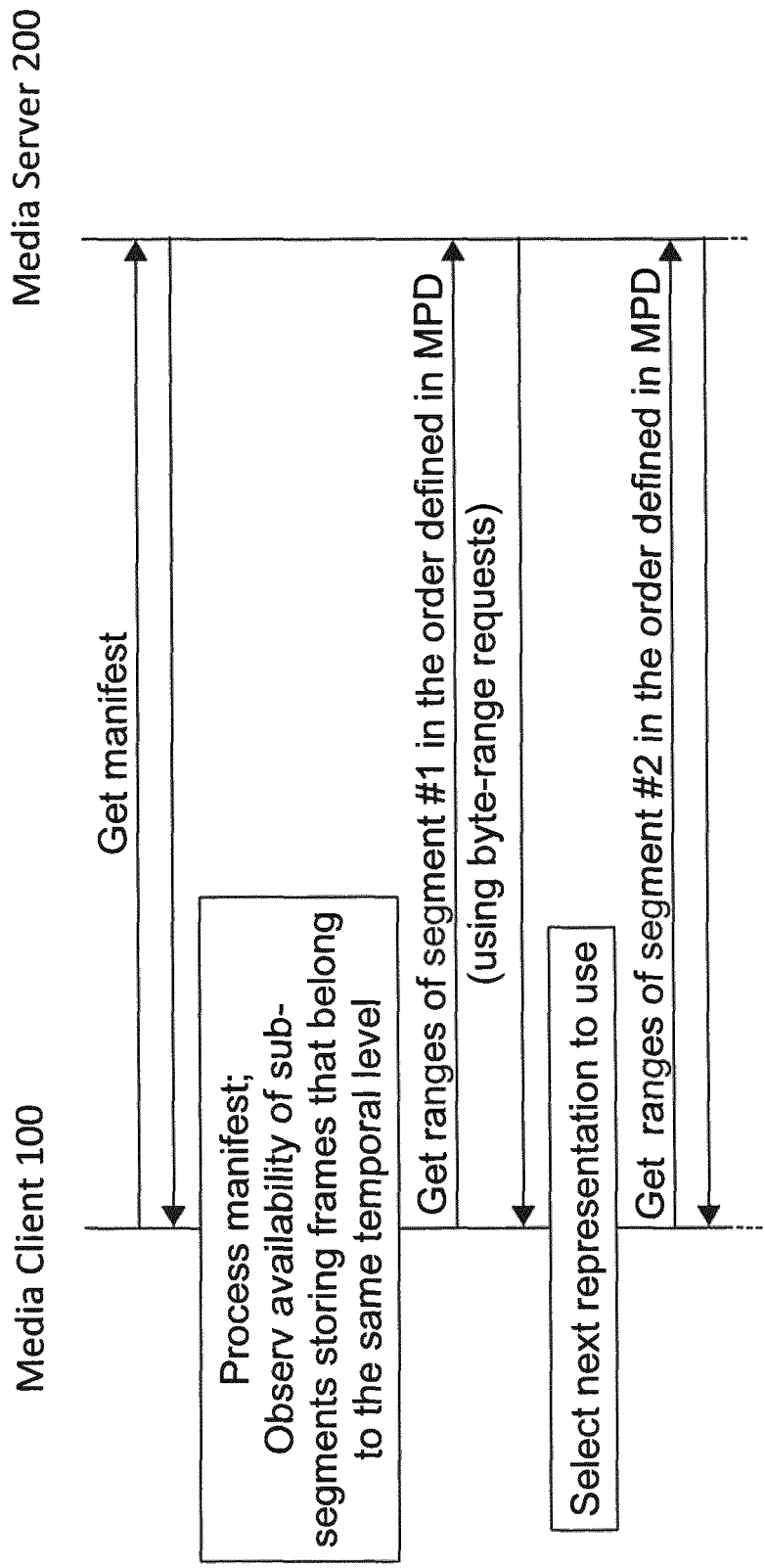
FIGS. 13 to 15 illustrate embodiments of further signalling diagrams.

The media client 100 capable of interpreting the information in the tags may perform a hierarchical download of the temporal levels of an individual media segment as shown in the signalling diagram of FIG. 13. The signalling diagram of FIG. 13 corresponds to the signalling diagram of FIG. 10 except for the fact that no separate indexing information has to be retrieved from the media server 200 by the media client 100. Rather, the media client 100 may process the manifest file (MPD) initially received from the media server 200 to determine the byte ranges of the media data items (e.g., video frames) that belong to a particular temporal level using the information illustrated in FIG. 12. The byte ranges of a particular media segment are then requested via HTTP GET requests in the order defined in the MPD to start with the byte range(s) of the lowest temporal level followed by the byte range(s) of the next highest temporal level.

The scenario illustrated in FIG. 13 off-loads the client processing in terms of requesting and parsing the indexing information. An alternative would be to configure the media client 100 to look for the download of a specific MPD file (e.g., having a specific name or suffix) containing the referencing information required for a hierarchical download of an individual media segment.

The process of requesting and obtaining multiple temporal levels of a particular media segment could also be based on dependent representations as has already been discussed with reference to FIG. 3, steps S2-2A and S2-2B of FIG. 4 and the exemplary data structure in FIG. 7.

Figure 14:
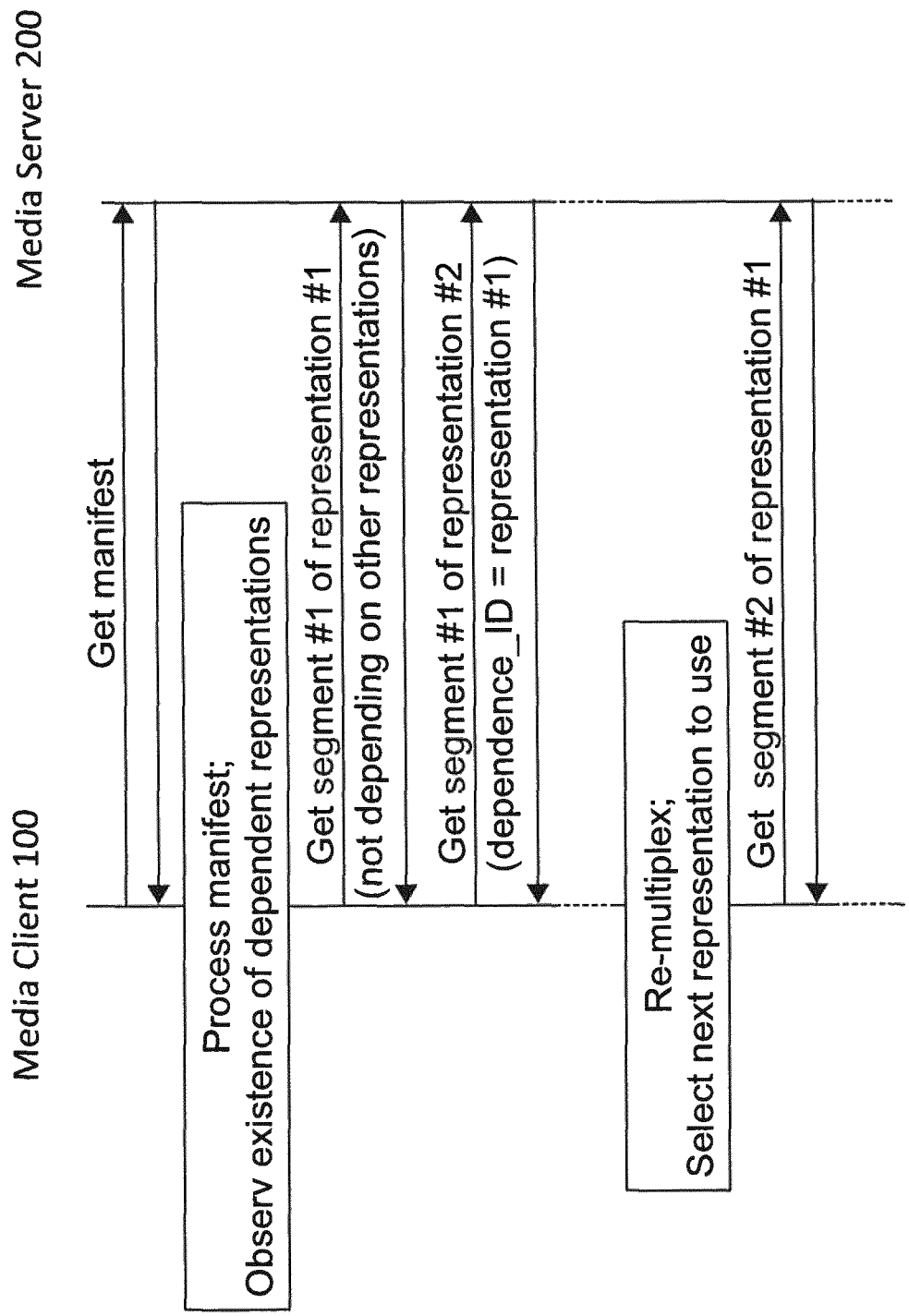

As has been explained above, the use of dependent representations for transporting individual temporal levels of a particular media segment in certain variants requires a co-operation with the content creator. In more detail, the content creator may prepare multiple segments (that could also be regarded as sub-segments) for each media content time interval (i.e., each "complete" media segment to be decoded and rendered). Each (sub-) segment contains the media data items belonging to a particular temporal level. The media content processor 500 will thus group the (sub-) segments containing different temporal levels into different representations and properly send the dependency_ids in the manifest file communicated to the media client 100. In this way, the media client 100 is able to download the different representations constituting a particular media segment on a temporal level-by-temporal level-basis as shown in FIG. 14. The different representations in regard of a particular media content time interval may then be re-combined by the media client 100 to the media segment that is to be decoded and rendered.

As shown in FIG. 14, the process starts with the media client 100 fetching the manifest (MPD) file from the media server 200. In a next step, the manifest file is processed (i.e., parsed) with regard to the existence of dependent representations belonging to different temporal levels for a particular media segment to be decoded and rendered. Then, the media client 100 requests the "base" representation that is not depending on other representations (i.e., the first temporal level), followed by requesting the next representation depending on the "base" representation (i.e., the next temporal level). The various representations comprising the temporal levels of a particular media segment to be rendered will be received by the media client 100 in the form of individual media segments, as shown in FIG. 14.

Once all representations belonging to a particular media segment to be rendered have been received, the various representations are re-combined (or "re-multiplexed") by the processing unit 150 of the media client 100 prior to be forwarded by the forwarding module 160 to the decoding module 165. As explained above, the media client 100 requires additional information for properly performing the re-combining (re-multiplexing) operation. One possibility in this regard is that the corresponding referencing (or indexing) information is appended to the media segment containing the lowest temporal level. Since this media segment will be downloaded first, the referencing information makes it possible to properly re-combine a temporally scaling bitstream with upper temporal level media data items if needed.

As will be appreciated, in the approach of conveying temporal levels in the form of dependent representations, no byte range requests will be needed. In certain variants, a byte range request as described in connection with other embodiments may have the advantage compared to the scenario of FIG. 14 that a full media segment (i.e., the full byte range of the media segment) may be downloaded at once if needed. Also, the use of byte range requests does not necessarily require particular additional effort on the side of the content creator, and legacy media clients are better supported. On the other hand, the representation-based approach does not require support for byte range requests in the media server. Moreover, different segments, or different representations, may be encrypted at the application layer, if needed.

A further embodiment of the technique presented herein to obtain the required temporal levels is based on a server push approach. This approach permits to use another feature available in HTTP/2, namely the server PUSH method.

Figure 15:
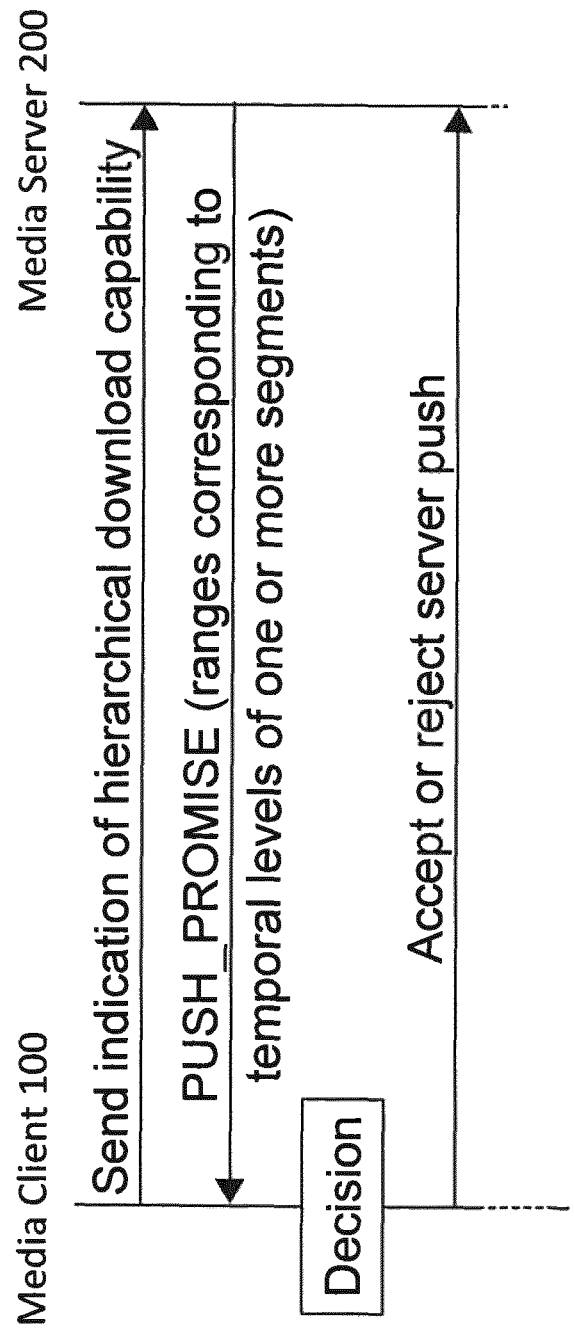

FIG. 15 illustrates a signalling diagram of an exemplary push procedure. In this regard, the media server 200 is configured such that if it receives an indication from the media client 100 that the media client 100 needs multiple temporal levels of a particular media segment sequentially, it then sends a PUSH_promise message to the media client 100 with the byte ranges corresponding to the different temporal levels in a particular media segment (see first two steps in FIG. 15). The media client 100 may then perform a decision whether or not to accept or reject the server push operation and inform the media server 200 accordingly. In case of acceptance, the media client 100 will receive the different parts of the media segments with different temporal levels without having to explicitly request them, and in the correct order.

The indication of the hierarchical download capability of the media client 100 send in the first step in the signalling diagram of FIG. 15 may take various forms. It may, for example, be an explicit indication in an additional attribute of the HTTP GET Universal Resource Identifier (URI) or as an additional request field. It may also be transmitted implicitly by the media server 200 may a notice of a particular client behaviour. For example, in the case of MPEG-2 TS, the request for the initialization index segment may be a good indicator. In the case of ISO base media format, the media client 100 could send a request of the first bytes of the segment to get the indexing information, so this may serve as an implicit indicator also.

As a still further possibility to transmit a client indication, the procedure illustrated in FIG. 13 may be exploited. In a similar manner as illustrated in FIG. 13, information on what byte range to request may be embedded in the MPD file that may refer to an initial or dummy range only. The media client 100 then sends the corresponding first range request to the media server 200, which interprets this request as an indicator of the hierarchical download capability of the media client 100.

The advantage of the push scenario is the fact that the media server 200 may push more multiple temporal media segment levels (optionally for multiple media segments) in advance, so that the number of requests generated and transmitted by the media client can be reduced. In case the media client 100 intends to change the representation, it may reset those streams that are not needed anymore. The fourth embodiment may also relax the client complexity (e.g., because the media client 100 does not have to infer temporal level information from the media indexing information as described in connection with FIGS. 9 and 10).

In all of the embodiments described above, the individual temporal levels of an individual media segment should all be downloaded by the media segment rendering deadline. When all media data items for every temporal level have arrived (e.g., for temporal levels 0, 1 and 2 in the exemplary scenarios of FIGS. 5 and 9), the complete media segment may be passed to the decoding module 165 of the media client 100 and can thus be decoded and rendered in the usual way.

In case of media data handling irregularities, for example because of a congestion situation within the communication network 20, it may occur that a portion of the media segment data cannot be downloaded in time. In such situations, the hierarchical transfer of individual temporal levels per media segment presented herein ensures that in many cases only the media data items of one or more higher temporal levels will be missing (e.g., B frames of temporal level 2 in the exemplary scenarios of FIGS. 5 and 9). In such a case the decoding module 165 can still decode the media segment, but will detect the missing media data items (e.g., the missing B frames) as unintentionally lost and take the necessary steps to handle that loss, but the decoding will continue. In the scenarios of FIGS. 5 and 9, the exemplary loss of B frames will not affect the decoding of the next available P frames as both are part of a lower temporal level.

The media data items deemed lost evidently cause some degradation in the media content rendering quality. The quality degradation generally depends on the scale of the loss and how much the decoding module 165 can conceal the effect of missing data items (which is dependent on the particular implementation of the decoding module 165). While the media rendering quality may degrade, there is still the benefit of reducing any media content rendering freezes because of the potential double advantage of starting the download of a smaller portion of a media data segment faster. In general, it is the re-buffering that will be perceived as the biggest degradation in the media consumption experience so that the technique presented herein will result in an overall QoE improvement.

Figure 16:
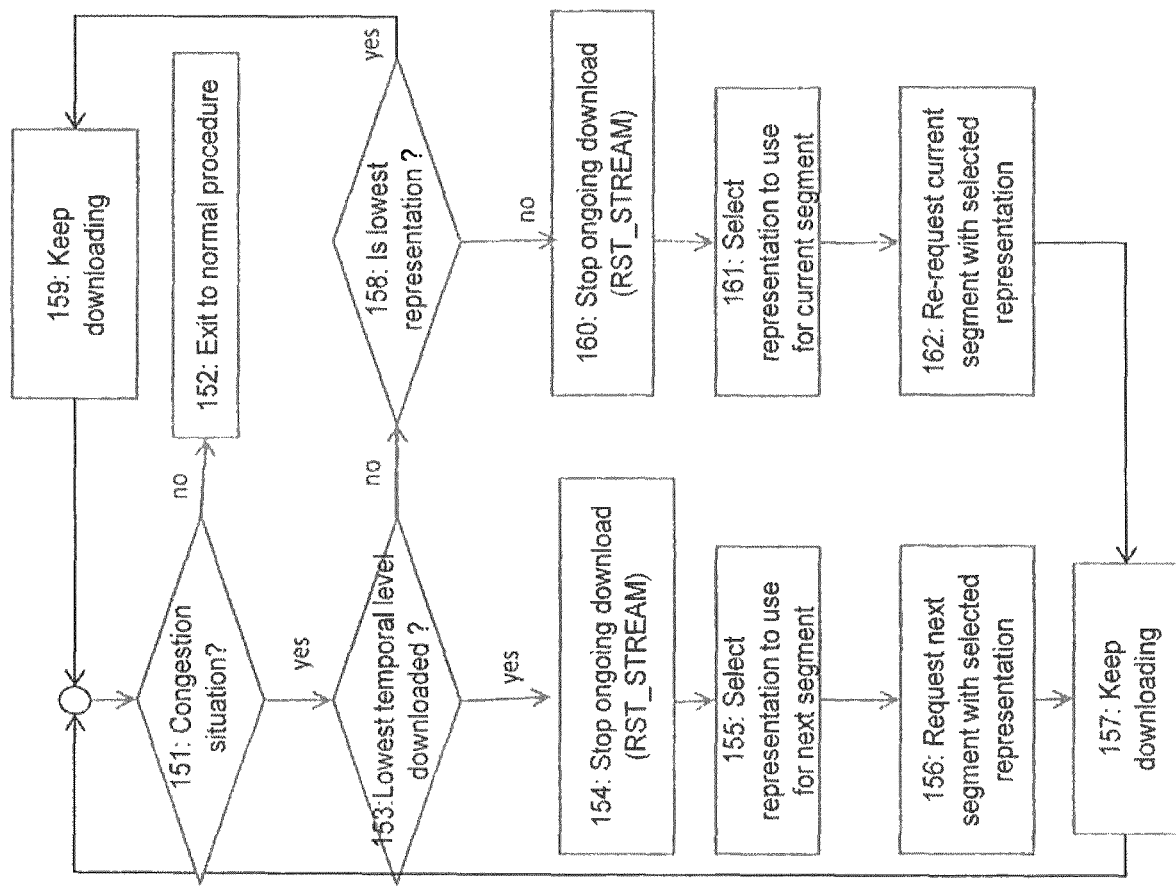
FIG. 16 illustrates a flow chart of a further method embodiment.

FIG. 16 illustrates in a flow chart a method embodiment performed by the media client 100 in case of a congestion situation or any other media content handling irregularity.

In an initial step 151, a congestion situation or any other media content handling irregularity is detected by the media client 100. Detection step 151 may be based on an indication received by the media client 100 from the media server 200 or any component within the communication network 20. The detection in step 151 may also be based on an internal functionality of the media client 100 that monitors a current buffer occupancy level, a throughput of the last media segment download, a time elapsed since the last media segment download, and so on.

In case no congestion situation or similar abnormality can be detected in step 151, the method proceeds to step 152 and exits to a normal media content handling procedure (or loops back to step 152). Otherwise, it is checked in step 153 if the lowest temporal level (i.e., the base level) has already been downloaded from the media server 200.

If it is determined in step 153 that the lowest temporal level has already been downloaded, it will be concluded that the current download pertains to a higher level of the media segment that can be stopped without any media content rendering freeze. The current download is then stopped in step 154. In step 155, the representation to use for the download of the next segment will be selected (typically the lowest representation, see also FIG. 7). Then, in step 156 the next media segment with the selected representation will be requested by the media client 100 from the media server 200. Typically, the following download will then be performed hierarchically by starting with the lowest temporal level of the next media segment in step 157. From step 157, the method loops back to step 151.

If it is determined in step 153 that the lowest temporal level has not yet been downloaded, it is determined in step 158 if the current download (which will then be for the lowest temporal level) is also for the lowest representation. If this is the case, the downloading process will continue in step 159 and the method will loop back to step 151. If, on the other hand, it is determined in step 158 that the current download does not pertain to the lowest representation, the ongoing download is stopped in step 160. Moreover, a different representation will be selected in step 161 for the current media segment. Then, in step 162, download of the current media segment will be re-requested with the selected representation (typically the lowest representation). The download re-requested in step 162 will typically start with the lowest temporal level of the media segment, followed by download of one or more higher temporal levels. From step 162 the method proceeds to step 157 to download the requested media data items, and from step 157 the method loops back to step 151.

In case of HTTP 1.1 an ongoing download may be stopped in steps 154 and 160 by breaking the TCP connection towards the media server 200. In the case of HTTP/2, the media client 100 may send a RST_STREAM frame (see Sect. 6.4 of RFC7540) that permits an immediate termination of a media content stream without terminating the underlying connection.

Even with HTTP/2, if the media content stream has started to be transferred, then those parts that have currently been passed to a TCP send buffer of the media server 200 cannot be removed and will thus be transferred. This drawback may be alleviated by setting a relatively small TCP send buffer (that may still allow a sufficiently large congestion window to be able to fill the available capacity). The drawback may be completely avoided by using a transport layer similar to the Quick UDP Internet Connection (QUIC) protocol that is also multiplexing streams. Such a transport layer may receive the stream reset information from the HTTP layer and thus remove all data of the corresponding stream from its buffer upon receiving the stream reset information from the HTTP layer.

In other embodiments a more efficient client adaptation becomes possible by exploiting the temporal level information presented herein. In the following it will exemplarily be shown how the media content rendering quality can be improved during the start-up phase.

One commonly used client adaptation approach is buffer-based. That means, the representation of the next media segment to download is based on the current buffer occupancy at the media client 100 (e.g., the occupancy of the buffering module 170 in the example of FIG. 2). In order to avoid buffer under-run, a "rate reservoir" may be applied. This "rate reservoir" may result in the selection of low initial rates in the start-up phase regardless of the available buffer capacity (which is also a reason why in some cases the buffer-based adaptation is combined with throughput estimates). The technique presented herein makes it possible that an up-switch to the next rate happens faster without decreasing the probability of freeze events. As an example, the up-switch can be performed when the buffer occupancy of the lowest temporal level already reaches the size of the "rate reservoir". Other, more refined client adaption mechanisms based on additional information related to size and current buffer occupancy in regard of different buffer levels are also possible.

The technique presented herein is useful as a stand-alone end-to-end solution for QoE enhancements in media content streaming systems. The technique can be further enhanced by interworking with QoS handling within the communication network 20 (see FIG. 1). For example, data packets carrying media content information belonging to different temporal levels may be tagged differently and may thus be transferred with different priorities though possible bottlenecks within the communication network 20. One advantage of this approach is that the overall download time for high-priority packets (with high priority temporal levels) will decrease. This advantage may be compensated by increasing somewhat the download times for the remaining part of the media segment. To implement an interworking with QoS handling in the communication network 20, it is necessary that at least one of the endpoints (e.g., one or both of the media client 100 and the media server 200) can signal the priority related to individual data packets. In this regard, the techniques as suggested for Virtual Private Networks (VPNs) or using transport protocol marking for packet priority information can be utilized.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A media client for an adaptive streaming system in which media content is provided by a media server as a sequence of consecutive media segments for being individually requested by media clients, each media segment comprising multiple media data items, the media client comprising:
 a memory; and
 at least one processor coupled to the memory, wherein the memory stores program code that configures the at least one processor to:
 generate a request that instructs the media server to transmit to the media client a first set of one or more media data items of a media segment, wherein the media segment comprises the first set of one or more media data items and at least a second set of one or more media data items, the request includes information identifying the media segment and the request further includes a reference to the first set of one or more media data items of the media segment, and further wherein each media data item included in the first set of media data items is associated with a first temporal level and each media data item included in the second set of media data items is associated with a second temporal level;
 trigger transmission of the request towards the media server; and
 process at least one media data item of the media segment received, in response to the request, from the media server.

2. The media client according to claim 1, wherein
the first temporal level is below the second temporal level in a temporal level hierarchy,
each media data item included in the second set of media data items depends on at least one media data item included in the first set of media data items.

3. The media client according to claim 1, wherein the program code further configures the processor to:
generate multiple requests in relation to the media segment, wherein each of the multiple requests includes a reference to a different set of media data items.

4. The media client according to claim 3, wherein the program code further configures the processor to:
trigger transmission of the multiple requests such that a request including a reference to a set of media data items associated with a lower temporal level of the media segment is transmitted before a request including a reference to set of media data items associated with a higher temporal level of the media segment.

5. The media client according to claim 3, wherein the program code further configures the processor to:
multiplex the multiple requests into one Internet Protocol packet.

6. The media client according to claim 1, wherein the program code further configures the processor to:
generate one request that triggers the media server to push to the media client multiple different media data item sets.

7. The media client according to claim 1, wherein
the request further includes a second reference the second set of media data items.

8. The media client according to claim 7, wherein the program code further configures the processor to:
detect a media content handling irregularity;
trigger, in response to the detection, an action that aborts or prevents reception of the at least one higher temporal level of the media segment from the media server, wherein the action comprises one of: i) breaking of a Transmission Control Protocol connection to the media server and ii) transmitting a message to cause the media server to prevent or abort transmission of the at least one higher temporal level of the media segment towards the media client; and
trigger, in response to the detection, transmission towards the media server of a further request including a reference to at least one lowest temporal level of a subsequent media segment.

9. The media client according to claim 1, wherein the program code further configures the processor to:
determine the reference to the first set of media data items from at least one of:
a manifest file pertaining to the media content;
a dedicated indexing segment referenced in a manifest file;
a first media segment of the media content;
an initialization segment pertaining to the media content; and
indexing information pertaining to the media segment or the media content.

10. The media client according to claim 1, wherein
the reference to the first set of media data items is a byte range.

11. The media client according to claim 10, wherein
the multiple temporal levels are defined as different byte ranges of the media content items within the media segment, and wherein the one or more locations are identified via one or more of the byte ranges.

12. The media client according to claim 1, wherein
the multiple temporal levels are defined as dependent media content representations, and wherein a particular reference in the request to a particular temporal level of the media segment identifies a particular media content representation.

13. The media client according to claim 1, wherein the program code further configures the processor to:
process multiple temporal levels of the media segment received from the media server by re-combining them into the media segment; and
forward the re-combined media segment to a media decoder.

14. The media client according to claim 1, wherein
the request includes a reference to two temporal levels of the media segment and wherein the two temporal levels belong to a dedicated Scalable Video Coding, SVC, layer or a dedicated Scalable High Efficiency Video Coding, SHVC, layer of the media content.

15. The media client of claim 1, wherein
the request is a Hypertext Transfer Protocol (HTTP) Get request,
the information identifying the media segment comprises a path portion of a Uniform Resource Identifier (URI),
the reference to the set of one or more data items comprises information identifying at least one byte range within the media segment, and
at least one media data item included in the set of one or more media data items is located within the identified byte range of the media segment.

16. A media server for an adaptive streaming system, the media server comprising a memory and at least one processor coupled to the memory, wherein the memory stores program code that configures the at least one processor to:
process a request transmitted by a media client, wherein the request comprises information identifying a media segment of a media content item, the media segment comprises a first set of one or more media data items associated with a first temporal level and a second set of one or more media data items associated with a second temporal level, and the request further includes a first reference to the first set of one or more media data items; and
trigger transmission of the first set of media data items to the media client.

17. The media server according to claim 16, wherein the program code further configures the processor to:
in response to a request transmitted by the media client, transmit to the media client information that contains the first reference to the first set of media data items and that further contains a second reference to the second set of media data items.

18. A method of operating a media client in an adaptive streaming system in which media content is provided by a media server as a sequence of consecutive media segments for being individually requested by media clients, each media segment comprising multiple media data items, the method comprising:
generating a request that instructs the media server to transmit to the media client a first set of one or more media data items of a media segment, wherein the media segment comprises the first set of one or more media data items and a second set of one or more media data items, the request includes information identifying the media segment and a reference to the first set of media data items of the media segment, and further wherein each media data item included in the first set of media data items is associated with a first temporal level and each media data item included in the second set of media data items is associated with a second temporal level;

triggering transmission of the request towards the media server; and processing at least one media data item of the media segment received, in response to the request, from the media server.

19. A method of operating a media server in an adaptive streaming system in which media content is provided by the media server as a sequence of consecutive media segments for being individually requested by media clients, each data segment comprising multiple media data items, the method comprising:

processing a request transmitted by a media client, wherein the request comprises information identifying a media segment of a media content item, the media segment comprises a first set of one or more media data items associated with a first temporal level and a second set of one or more media data items associated with a second temporal level, and the request includes a reference to the first set of one or more media data items; and triggering transmission of the first set of media data items to the media client.

20. A computer program product comprising a non-transitory computer readable medium storing program code portions for performing the method of claim 18.

21. A computer program product comprising a non-transitory computer readable medium storing program code portions for performing the method of claim 19.

* * * * *